US012617725B2

(12) United States Patent
Qi et al.

(10) Patent No.: US 12,617,725 B2
(45) Date of Patent: *May 5, 2026

(54) METHOD FOR MAKING CARBONATED PRECAST CONCRETE PRODUCTS WITH ENHANCED DURABILITY

(71) Applicant: CARBICRETE INC, Montreal (CA)

(72) Inventors: Hucheng Qi, London (CA); Mehrdad Mahoutian, Montréal (CA); Karmen Hoge, Kirkland (CA)

(73) Assignee: CARBICRETE INC., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,692

(22) Filed: Nov. 28, 2022

(65) Prior Publication Data

US 2023/0150878 A1    May 18, 2023

Related U.S. Application Data

(63) Continuation of application No. 17/234,952, filed on Apr. 20, 2021, now Pat. No. 11,597,685.

(Continued)

(51) Int. Cl.
*C04B 28/08* (2006.01)
*B28B 1/52* (2006.01)
(Continued)

(52) U.S. Cl.
CPC .............. *C04B 28/082* (2013.01); *B28B 1/52* (2013.01); *B28B 11/24* (2013.01); *B28B 11/245* (2013.01);
(Continued)

(58) Field of Classification Search
CPC ........... C04B 40/0295; C04B 40/0277; C04B 40/0236; C04B 28/082; C04B 14/04;
(Continued)

(56) References Cited

U.S. PATENT DOCUMENTS 2,969,575 A    1/1961  Gagne
4,117,197 A  *  9/1978  Krejci ................. C04B 41/5092
                                                       427/403
(Continued)

FOREIGN PATENT DOCUMENTS

CA          2942401 A     9/2015
CA          2942401 A1    9/2015
(Continued)

OTHER PUBLICATIONS

Machine English translation of Kurita et al. (JP-2002274976-A) (Year: 2002).*
(Continued)

*Primary Examiner* — Jeffrey M Wollschlager
*Assistant Examiner* — Edgaredmanuel Troche
(74) *Attorney, Agent, or Firm* — CANTOR COLBURN LLP

(57) ABSTRACT

A method for making a carbonated precast concrete product includes: obtaining a mixture including at least one binder material, an aggregate, and water; molding the mixture into a molded intermediate; demolding the molded intermediate to obtain a demolded intermediate, the demolded intermediate having a first water-to-binder ratio; conditioning the demolded intermediate to provide a conditioned article having a second water-to-binder ratio less than the first water-to-binder ratio of the demolded intermediate; moisturizing at least one surface of the conditioned article with an aqueous medium, thereby causing a weight gain of the conditioned article and providing a moisturized product, a first portion of the moisturized product having a third water-to-binder ratio greater than a fourth water-to-binder ratio of a remainder of the moisturized product; and curing the moisturized product with carbon dioxide to obtain the carbonated precast concrete product.

16 Claims, 5 Drawing Sheets

Related U.S. Application Data

(60) Provisional application No. 63/034,037, filed on Jun. 3, 2020.

(51) Int. Cl.

| | |
|---|---|
| *B28B 11/24* | (2006.01) |
| *C04B 14/04* | (2006.01) |
| *C04B 20/00* | (2006.01) |
| *C04B 24/26* | (2006.01) |
| *C04B 40/02* | (2006.01) |
| *C04B 103/30* | (2006.01) |
| *C04B 103/32* | (2006.01) |
| *C04B 103/65* | (2006.01) |

(52) U.S. Cl.

CPC ............ *C04B 14/04* (2013.01); *C04B 20/006* (2013.01); *C04B 24/2641* (2013.01); *C04B 40/0236* (2013.01); *C04B 40/0277* (2013.01); *C04B 40/0295* (2013.01); *C04B 2103/304* (2013.01); *C04B 2103/32* (2013.01); *C04B 2103/65* (2013.01)

(58) Field of Classification Search

CPC .............. C04B 20/006; C04B 24/2641; C04B 2103/304; C04B 2103/32; C04B 2103/65; C04B 20/1074; C04B 20/1077; C04B 20/1081; C04B 20/1085; C04B 20/12; C04B 20/123; C04B 20/126; C04B 40/0281; C04B 28/02; C04B 40/0231; C04B 28/008; C04B 28/182; C04B 41/45; C04B 12/04; C04B 28/08; C04B 41/5307; C04B 35/62655; C04B 2235/606; C04B 2235/6565; C04B 33/30; C04B 35/6266; C04B 28/04; C04B 2111/2038; C04B 2111/29; C04B 2111/00; C04B 2111/00017; C04B 2111/00068; C04B 2111/00077; C04B 18/08; C04B 18/141; C04B 18/142; C04B 22/064; C04B 24/2647; C04B 40/0028; C04B 40/0071; C04B 2201/20; C04B 2201/50; C04B 41/5076; C04B 41/5079; C04B 41/5084; C04B 41/65; C04B 28/10; C04B 14/06; C04B 2103/30; C04B 22/066; C04B 22/10; C04B 40/0286; C04B 7/02; C04B 2/005; C04B 2/06; C04B 2111/00112; C04B 2111/00379; C04B 2111/00758; C04B 7/345; C04B 7/36; C04B 20/107; C04B 2103/0006; C04B 2103/001; C04B 2103/0012; C04B 2111/00198; C04B 41/009; C04B 41/52; B28B 11/242–245; B28B 1/52; B28B 11/24; B28B 19/0015; B28B 1/522; B28B 11/045; B28B 2038/166; B28B 1/54; Y10T 428/2993; F26B 25/22; Y02P 40/18; E04C 1/00; B01D 2257/504; B01D 53/62

USPC .............. 264/241, 256, 308, 2.6, 129; 34/60

See application file for complete search history.

(56) References Cited

U.S. PATENT DOCUMENTS

| | | | | |
|---|---|---|---|---|
| 4,362,679 | A | 12/1982 | Malinowski | |
| 4,588,443 | A | 5/1986 | Bache | |
| 4,588,543 | A | 5/1986 | Shimizu | |
| 5,021,205 | A | 6/1991 | Niioka | |
| 5,250,113 | A | 10/1993 | Berke | |
| 5,358,676 | A * | 10/1994 | Jennings | B28B 11/245 |
| | | | | 264/102 |
| 5,366,549 | A | 11/1994 | Imaizumi | |
| 8,845,594 | B2 | 9/2014 | Jennings | |
| 9,969,102 | B2 * | 5/2018 | Vincent | C04B 28/14 |
| 10,112,871 | B2 | 10/2018 | Shao | |
| 10,338,053 | B2 | 7/2019 | Atakan | |
| 10,570,064 | B2 | 2/2020 | Monkman | |
| 10,662,121 | B1 | 5/2020 | D'Avela | |
| 2002/0152711 | A1 * | 10/2002 | Schmitz | C04B 40/0675 |
| | | | | 52/612 |
| 2009/0169849 | A1 * | 7/2009 | Bliton | B32B 7/14 |
| | | | | 428/220 |
| 2013/0343734 | A1 | 12/2013 | Dock | |
| 2014/0197563 | A1 | 7/2014 | Niven | |
| 2014/0272284 | A1 * | 9/2014 | Franke | B28B 7/183 |
| | | | | 428/137 |
| 2014/0322083 | A1 | 10/2014 | Kuppler | |
| 2015/0141552 | A1 * | 5/2015 | Takizawa | C04B 22/06 |
| | | | | 264/102 |
| 2016/0332911 | A1 * | 11/2016 | Turpin, Jr. | C04B 28/02 |
| 2017/0036372 | A1 | 2/2017 | Sandberg | |
| 2017/0073270 | A1 * | 3/2017 | Shao | B28B 11/245 |
| 2017/0102373 | A1 | 4/2017 | Atakan | |
| 2017/0241871 | A1 | 8/2017 | Mayelle | |
| 2018/0230057 | A1 * | 8/2018 | Guynn | C04B 14/42 |
| 2018/0258000 | A1 | 9/2018 | Lee | |
| 2019/0047175 | A1 * | 2/2019 | Hargest | C04B 40/0236 |
| 2019/0077045 | A1 | 3/2019 | Monkman | |
| 2019/0168416 | A1 | 6/2019 | Monkman | |
| 2019/0241473 | A1 * | 8/2019 | Goerger | C04B 14/06 |
| 2020/0181032 | A1 | 6/2020 | Michud | |
| 2020/0299203 | A1 * | 9/2020 | Sant | C04B 2/02 |
| 2021/0107834 | A1 | 4/2021 | Seth | |

FOREIGN PATENT DOCUMENTS

| | | | | |
|---|---|---|---|---|
| CA | 3038515 | A1 | 3/2018 | |
| CA | 30385165 | A1 | 3/2018 | |
| CN | 101774790 | A | 7/2010 | |
| CN | 107879704 | A | 4/2018 | |
| CN | 108789800 | A | 11/2018 | |
| CN | 110818356 | A | 2/2020 | |
| EP | 3760404 | A1 * | 1/2021 | ............ B28B 1/008 |
| GB | 217791 | | 6/1924 | |
| GB | 217791 | A | 6/1924 | |
| GB | 2177785 | A * | 1/1987 | ............ C04B 33/30 |
| JP | 63103878 | A | 5/1988 | |
| JP | 02137782 | A | 5/1990 | |
| JP | 10034641 | A * | 2/1998 | ........... B28B 23/028 |
| JP | 2000281467 | A | 10/2000 | |
| JP | 2002274976 | A * | 9/2002 | |
| JP | 2005053078 | A | 3/2005 | |
| JP | 201157514 | A | 3/2011 | |
| JP | 2013107284 | A | 6/2013 | |
| JP | 2013234083 | A | 11/2013 | |
| WO | 2004074733 | A1 | 9/2004 | |
| WO | 2007005041 | A1 | 1/2007 | |
| WO | 2017000075 | A1 | 1/2017 | |
| WO | 2017041176 | A1 | 3/2017 | |
| WO | 2017041188 | A1 | 3/2017 | |
| WO | 2017075126 | A1 | 5/2017 | |
| WO | 2017127454 | A1 | 7/2017 | |
| WO | 2017152120 | A1 | 9/2017 | |
| WO | 2017155899 | A1 | 9/2017 | |
| WO | 2017177324 | A1 | 10/2017 | |
| WO | 2017192938 | A1 | 11/2017 | |
| WO | 2017210294 | A1 | 12/2017 | |
| WO | 2018058139 | A1 | 3/2018 | |
| WO | 2018175748 | A1 | 9/2018 | |
| WO | 2018175769 | A1 | 9/2018 | |
| WO | 2018232507 | A1 | 12/2018 | |
| WO | 2019060992 | A1 | 4/2019 | |
| WO | 2019101809 | A1 | 5/2019 | |
| WO | 2019101810 | A1 | 5/2019 | |
| WO | 2019101811 | A1 | 5/2019 | |
| WO | 2019112555 | A1 | 6/2019 | |
| WO | 2019165275 | A1 | 8/2019 | |
| WO | 2019165281 | A1 | 8/2019 | |
| WO | 2020046927 | A1 | 3/2020 | |

(56) References Cited

FOREIGN PATENT DOCUMENTS

WO      2020124054 A1      6/2020
WO      2020217232 A1      10/2020
WO      2021071980 A1      4/2021

OTHER PUBLICATIONS

NPL Vacuum De-Watering (VDW), Aug. 11, 2013, https://face-consultants.com/vacuum-de-watering-vdw/ (Year: 2013).*
Machine Englsih translation of Furuya et al. (JP H1034641 A) (Year: 1998).*
NPL Vacuum De-Watering (VDW); Retreived from https://face-consultants.com/vacuum-de-watering-vdw/ (Year: 2013).*
European Search Report for corresponding application EP21794696: Report dated Nov. 21, 2022.
Environmental Protection Agency. (1995). AP 42—Compilation of Air Pollutant Emission Factors, 5th Edition, vol. 1; Appendix A, B1 and B2. Research Triangle Park, NC. U. S. Environmental Protection Agency.
Akers, S. A., & Studinka J., (1989). Ageing behaviour of cellulose fibre cement composites in natural weathering and accelerated tests. International Journal of Cement Composites and Lightweight Concrete, 11(2), 93-97. https://doi.org/10.1016/0262-5075(89)90119-X (year: 1989).
Harsh Gupta et al., Strength Properties of Steel Slag in Concrete, Nov. 2017, International Journal of Engineering Research & Technology (IJERT), vol. 6, Issue 11 (Year: 2017).
International Search Report for corresponding application PCT/CA2020/050467 filed Apr. 9, 2020; Report dated Jun. 22, 2020.
International Search Report for corresponding application PCT/CA2020/051702 filed Dec. 10, 2020; Mail date Mar. 16, 2021.
International Search Report PCT/CA2020/050466 filed Apr. 9, 2020; Mail date Jun. 10, 2020.
Shao Yixin, Morsher Abu (2013)—Early carbonation for hollow-core concrete slab curing and carbon dioxide recycling. Materials and Structures (2015) 48:307-319.
Written Opinion for corresponding application PCT/CA2020/051702 filed Dec. 10, 2020; Mail date Mar. 16, 2021.
Written Opinion of the International Searching Authority for corresponding application PCT/CA2020/050467 filed Apr. 9, 2020; Report dated Jun. 22, 2020.
Written Opinion of the International Searching Authority for PCT/CA2020/050466 filed Apr. 9, 2020; Mail date Jun. 10, 2020.

ACI Committee. (2008). 201.2R-08: Guide to Durable Concrete Durability. Michigan, US: American Concrete Institute.
ASTM C418. Standard Test Method for Abrasion Resistance of Concrete by Sandblasting.
ASTM C494-99a (Standard Specification for Chemical Admixtures for Concrete, ASTM International, West Conshohocken, PA, 2019).
ASTM. (2018a). Standard Specification for Solid Concrete Interlocking Paving Units (vol. ASTM C936-20, ASTM C936-16). West Conshohocken, PA: ASTM International.
ASTM. (2018b). Standard Test Method for Evaluating the Freeze-Thaw Durability of Dry-Cast Segmental Retaining Wall Units and Related Concrete Units (vol. ASTM C1262-18). West Conshohocken, PA: ASTM International.
ASTM. (2018c). Standard Test Methods for Sampling and Testing Concrete Masonry Units and Related Units (vol. ASTM C140-20). West Conshohocken, PA: ASTM International.
ASTM. (2019a). Standard Test Method for Abrasion Resistance of Concrete or Mortar Surfaces by the Rotating-Cutter Method (vol. ASTM C944-99). West Conshohocken, PA: ASTM International.
ASTM. (2019b). Standard Test Method for Freeze-thaw and De-icing Salt Durability of Solid Concrete Interlocking Paving Units (vol. ASTM C1645-15). West Conshohocken, PA: ASTM International.
ASTM. Standard Specification for Dry-Cast Segmental Retaining Wall Units (vol. ASTMC1372-04 & ASTM C1372-11). West Conshohocken, PA: ASTM International.
CSA A231.2-14 Precast concrete pavers. 2014.
Patel, H., Bland, C.H., and Poole, A.B. "The Microstructure of Concrete Cured at Elevated Temperatures". Cement and Concrete Research, 25(3). (1995). pp. 485-490.
Zhang, D., Ghouleh, Z. and Shao, Y. , "Review on carbonation curing of cement-based materials". Journal of CO2 Utilization, 21, (2017). pp. 119-131.
International Search Report for corresponding application PCT/CA2021/050533 filed Apr. 20, 2021; Mail date Jul. 14, 2021.
Written Opinion of the International Searching Authority for corresponding application PCT/CA2021/050533 filed Apr. 20, 2021; Mail date Jul. 14, 2021.
Mahoutian Mehrdad: "Strength Gain and Carbon Dioxide Uptake in Carbonation Activated Steel Slag Binders", Thesis, Aug. 1, 2014, XP055981529.
European Office Action for corresponding application EP21794696. 1; Report dated Oct. 2, 2023.
Japanese Office Action for corresponding application 2022-573394; Report Jan. 7, 2025.

* cited by examiner

METHOD FOR MAKING CARBONATED PRECAST CONCRETE PRODUCTS WITH ENHANCED DURABILITY

CROSS-REFERENCE TO RELATED APPLICATION

The present application is a continuation of U.S. patent application Ser. No. 17/234,952 filed on Apr. 20, 2021 which claims priority to U.S. Patent Application No. 63/034,037 filed Jun. 3, 2020, both of which said applications are incorporated herein by reference in their entirety.

TECHNICAL FIELD

This disclosure relates generally to precast concrete products, such as but not limited to concrete pipes, traffic barriers, walls, boxes, culverts, tiles, pavers, hollow-core slabs, patio slabs, steps, curbs, retaining walls and concrete masonry units. More particularly, the present disclosure relates to carbonated precast concrete products and methods of making them.

BACKGROUND

Precast concrete has become widely adopted in the construction industry. Precast concrete is a construction product that is cast into a reusable mold or form under controlled factory conditions. It cures in a controlled curing environment in the factory. After curing, it is then transported to the building site.

There is a wide range of structural and architectural applications for precast concrete. Some common examples include pavers, foundations, slabs, beams, floors, columns, walls, retaining walls, manholes, sewage pipes, blocks, modular boxes, bridge decks, and so on.

Traditionally, Portland cement is used as the binder in the manufacturing of precast concrete products. However, the manufacturing of Portland cement is known to have undesirable environmental impacts. For every tonne of Portland cement produced, approximately one tonne of $CO_2$ is released. The acquisition of Portland cement involves quarrying, emitting airborne pollutants and entails the use of large-scale kilns, requiring substantial amounts of energy.

Cement-based precast products rely on the hydration of cement to obtain satisfactory strength. Heat and steam curing techniques have been widely adopted as the standard curing methods to accelerate early strength development in traditional cement-based precast concrete products.

Curing precast concrete in a $CO_2$-rich environment may offer a reduction of the environmental impacts of precast concrete. This is known as carbonated precast concrete. While such carbonated precast concrete has certain environmental advantages, there remains a need to improve other physical properties of carbonated precast concrete, such as its ability to better endure freeze-thaw cycles and abrasion.

SUMMARY

In one aspect, there is provided a method for making a carbonated precast concrete product comprising: obtaining a mixture including at least one binder material, an aggregate, and water; molding the mixture into a molded intermediate; demolding the molded intermediate to obtain a demolded intermediate, the demolded intermediate having a first water-to-binder ratio; conditioning the demolded intermediate to provide a conditioned article having a second water-to-binder ratio less than the first water-to-binder ratio of the demolded intermediate; moisturizing at least one surface of the conditioned article with an aqueous medium, thereby causing a weight gain of the conditioned article and providing a moisturized product, a first portion of the moisturized product having a third water-to-binder ratio greater than a fourth water-to-binder ratio of a remainder of the moisturized product; and curing the moisturized product with carbon dioxide to obtain the carbonated precast concrete product.

In some embodiments, the moisturizing of the at least one surface includes applying the aqueous medium using an application method selected from dipping the at least one surface partly or wholly in a water-containing liquid, spraying the aqueous medium to the at least one surface, or applying the aqueous medium to the at least one surface with a roller device.

In some embodiments, the moisturizing of the at least one surface of the conditioned article includes moisturizing the at least one surface until the conditioned article achieves a weight gain of at least 10 g/m2.

In some embodiments, the applying of the aqueous medium includes applying water, a water-based solution, and/or a water-based slurry on the at least one surface.

In some embodiments, the applying of the aqueous medium includes applying the aqueous medium being at a temperature of from 15 to 25° C.

In some embodiments, the conditioning of the demolded intermediate includes conditioning the demolded intermediate until between 20% to 70% by weight of an initial moisture content of the demolded intermediate is removed.

In some embodiments, the obtaining of the mixture includes obtaining a dry part and a liquid part, the dry part having at least one aggregate material and at least one binder material, the liquid part having water, and mixing the dry part with the liquid part to obtain the mixture.

In some embodiments, the method comprises mixing additives with the dry part and the liquid part.

In some embodiments, the method comprises mixing micro-fibers with the dry part.

In some embodiments, the obtaining of the mixture includes obtaining the mixture having the at least one binder material being non-cementitious.

In some embodiments, the obtaining of the mixture includes obtaining the mixture having the at least one binder comprising steel slag and cement in a weight ratio of steel slag to cement of from 1:20 to 20:1.

In some embodiments, the obtaining of the mixture includes obtaining the mixture having the aggregate in a weight ratio of the aggregate to a total weight of the mixture of 0.3 to 0.8.

In some embodiments, the obtaining of the mixture includes obtaining the mixture wherein a weight ratio of the additive to a total weight of the mixture is of from 0.005 to 0.010.

In some embodiments, the obtaining of the mixture includes obtaining the mixture including an admixture.

In some embodiments, the admixture is a water repellent admixture.

In some embodiments, the admixture is a plasticizer, a superplasticizer or a polycarboxylate-based water reducer.

In some embodiments, the molding of the mixture includes forming the mixture into a formed intermediate.

In some embodiments, the molding of the mixture includes consolidating the formed intermediate to provide the molded intermediate.

In another aspect, there is provided a method of for making a carbonated precast concrete product comprising: obtaining a substrate mixture including at least one binder material, an aggregate, and water, and an external layer mixture including at least one second binder material, a second aggregate, and water; molding the substrate mixture and the external layer mixture into a multilayer molded intermediate having an external layer and a substrate; demolding the multilayer molded intermediate to obtain a demolded multilayer intermediate, the demolded multilayer intermediate having a first water-to-binder ratio for the substrate and a second water-to-binder ratio for the external layer; conditioning the demolded multilayer intermediate to provide a conditioned multilayer article having a reduced amount of water relative to that of the demolded multilayer intermediate having the first water-to-binder ratio and the second water-to-binder ratio; moisturizing at least one surface of the external layer of the conditioned multilayer article with an aqueous medium to cause a weight gain of the external layer to provide a moisturized multilayer product in which the external layer has a third water-to-binder ratio greater than the second water-to-binder ratio; and curing the moisturized multilayer product with carbon dioxide to obtain the carbonated precast concrete product.

In some embodiments, the moisturizing of the at least one surface of the external layer includes applying the aqueous medium using an application method selected from dipping the at least one surface partly or wholly in a water-containing liquid, spraying the aqueous medium to the at least one surface, or applying the aqueous medium to the at least one surface with a roller device.

In yet another aspect, there is provided, a method for making a carbonated precast concrete product comprising: obtaining a demolded intermediate from a molded mixture comprising at least one binder material, an aggregate, and water, the demolded intermediate having a first water-to-binder ratio; conditioning the demolded intermediate to provide a conditioned article having a second water-to-binder ratio less than the first water-to-binder ratio of the demolded intermediate; moisturizing at least one surface of the conditioned article with an aqueous medium to cause a weight gain of the conditioned article to provide a moisturized product, a first portion of the moisturized product having a third water-to-binder ratio greater than a fourth water-to-binder ratio of a remainder of the moisturized product; and curing the moisturized product with carbon dioxide to obtain the carbonated precast concrete product.

Many further features and combinations thereof concerning the present improvements will appear to those skilled in the art following a reading of the instant disclosure.

DETAILED DESCRIPTION

Figure 1:
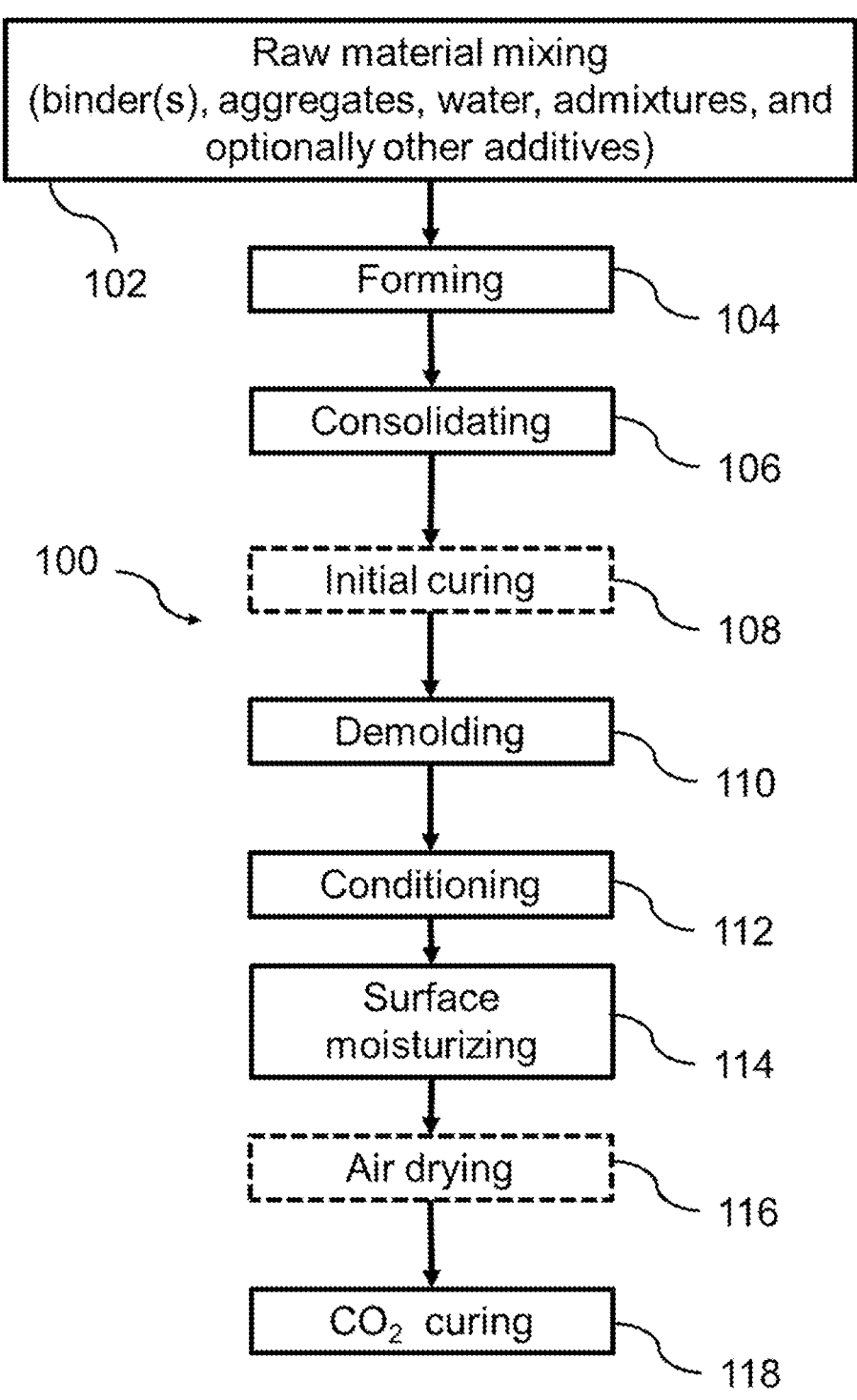
FIG. 1 is a flow chart illustrating a process for manufacturing carbonated precast concrete products.

The present process for preparing carbonated precast concrete products may require less, and, in some cases, no cement, and may allow concrete to store $CO_2$ within the product. The carbonated precast concrete products of the present disclosure may advantageously have improved physical attack resistance, such as a resistance to freeze-thaw cycles and abrasion. Carbonation curing also offers the potential to introduce industrial waste materials as cement replacements. These waste material include, for instance, steel slag. The processes of the present disclosure may not only be able to reduce the $CO_2$ footprint of concrete, but may also allow precast concrete products to be made in a more affordable manner due to the use of currently under-utilized, low-cost industrial waste materials such as steel slag and bottom ash. Steel slag is a by-product of steel making, and is produced during the separation of molten steel from impurities in steel-making furnaces. The steel slag occurs as a molten liquid melt and is a solution including silicates and oxides that solidifies upon cooling. Bottom ash is a coarse, granular, incombustible by-product of coal combustion that is collected from the bottom of furnaces.

Examples of precast concrete products which may be produced using the methods described herein include, but are not limited to, concrete pipes, traffic barriers, walls including retaining walls, boxes including modular boxes, culverts, tiles, pavers, foundations, slabs including hollow-core slabs, patio slabs, steps, curbs, concrete masonry units, beams, floors, columns, manholes, sewage pipes, railroad ties, and other precast concrete products.

The manufacturing of carbonated precast concrete products differs from the manufacture of traditional cement-based precast concrete mainly in the application of carbon dioxide during the carbonation curing process and a broader selection of qualified binder sources (e.g., cement). Carbonated precast concrete acquires its strength mainly through the reaction between the introduced carbon dioxide gas with the oxides, and/or hydroxides of calcium and/or magnesium in the binder, with the help of sufficient amount of water in the mixture. When exposed to high or low concentrations of $CO_2$, precast containing such minerals often experience rapid hardening.

Freeze-Thaw and Abrasion Durability

The lack of durability of certain existing concrete structures may, in some cases, cause serious and detrimental damages, rendering the product unsuitable for its intended application. The present disclosure relates to processes via which a concrete product having improved durability, more specifically, improved freeze-thaw durability and abrasion durability, may be manufactured. In some cases, the disclosed processes may improve other mechanical/physical properties.

Freeze-thaw damage is induced by internal tensile stresses built up as a result of repetitive cycles of freezing and thawing. The expansion of water and the hydraulic pressure of the expansion forces of unfrozen water particles contribute to the damage caused by freeze-thaw cycles. When de-icing salts are present in the freeze-thawing process, the resulting damage on precast concrete can be exacerbated.

Surface wear is the progressive mass loss from the concrete's surface due to repetitive attrition cycles. Abrasion is one of the main surface wear mechanisms and refers to the attrition of other solid objects that move along the concrete's surface. The source of abrasion depends on the application of precast concrete.

The durability of precast concrete products is measured through a series of standard tests. The tests and requirements vary depending on product type and its application. As an example, an overview of the standard tests for precast concrete pavers and retaining walls is given below. The present disclosure refers to a plurality of standards (e.g., ASTM standards). It will be understood that these standards correspond to versions that were available at the date of filing of the instant patent application.

There are several ways to evaluate the abrasion resistance of precast concrete. In addition to the sandblasting testing method (ASTM C418) specified by ASTM C936 for evaluating the abrasion resistance of concrete pavers, a rotating-cutter method (ASTM C944) can also be applied to measure the abrasion resistance of precast concrete products. In the rotating-cutter method, the test apparatus consists of a drill press and a rotating cutter. The concrete sample is placed under the rotating cutter and a constant vertical load of 98 N is applied to the spindle that turns the cutter. The sample is subjected to abrasive wear at a speed of 200 rpm for a period of two minutes and the mass loss rate is calculated (ASTM, 2019a).

The freeze-thaw durability of the precast concrete pavers is tested according to CSA A231.2 or ASTM C1645 as required by ASTM C936. During the test, precast concrete samples are completely submerged in a 3% sodium chloride solution. They are subjected to cyclic 24-hour periods of freezing and thawing, with 16 hours of freezing and 8 hours of thawing. After 28 cycles of freeze-thaw testing, the mass loss of precast concrete should not exceed 225 $g/m^2$ of the total surface area, or, after 49 cycles of freeze-thaw testing, the mass loss of precast concrete should not exceed 500 $g/m^2$ of the total surface area (ASTM, 2019b, ASTM, 2018a, CSA, 2005).

The freeze-thaw durability of precast concrete retaining walls is tested according to ASTM C1262. During the test, retaining wall samples are placed face-down in water with a depth of 13±2 mm (ASTM, 2018b). The weight loss of a set of five samples should not exceed 1% of their initial weight after 100 cycles of freezing and thawing, or, the weight loss of four out of five samples should not exceed 1.5% of their initial weight after 150 cycles (ASTM, 2017). One cycle of freezing and thawing is defined by a complete freezing cycle followed by a complete thawing cycle. The retaining wall samples can also be partly submerged in 3% sodium chloride solution. In this case, the requirement of less than 1% mass loss is generally reduced to 40 cycles of freeze-thaw testing.

Carbonated concrete may exhibit low freeze-thaw resistance, thus rendering it unsuitable for applications such as pavers and retaining walls. Furthermore, carbonated precast concrete may behave poorly under abrasion conditions, making it inappropriate for paver applications.

With traditional methods, there is often a moisture starvation on the surface of precast concrete prior to carbonation curing. It is believed that although this surface moisture starvation does not significantly affect the compressive strength of carbonated precast concrete, certain other properties of the carbonated concrete products, such as the flexural strength, surface hardness and surface durability of the product (including at least one of abrasion resistance and freeze-thaw resistance) are compromised. As a result, carbonated precast concrete products often do not meet certain durability requirements for applications in which they are intended to be used.

It has been found that the processes disclosed herein may improve at least certain durability properties of carbonated precast concrete products as measured by the freeze-thaw and abrasion resistance. It was also observed that the carbonated precast concrete products so made may maintain their strength with time and freeze-thaw cycles.

The present disclosure relates to a process of manufacturing carbonated precast concrete products. The main components to make carbonated precast concrete include a binder, aggregates, and water. Depending on the types of raw materials and the specifications for carbonated precast concrete, other additives may be included.

Binders

The cementitious and/or non-cementitious binder in carbonated precast concrete includes any of the following carbonatable materials as well as their combinations: ordinary Portland cement, other types of cement, non-hydraulic cement, hydraulic cement, ground granulated blast-furnace slag (GGBFS), steel slag, fly ash, bottom ash, stainless steel slags, and other materials that are rich in CaO and/or MgO and/or calcium-silicate content. Any suitable combinations of two or more binders may be used. In some cases, a single binder may be used. In some embodiments, the binder is a cementitious binder and may comprise ordinary Portland cement, other types of cement, non-hydraulic cement, hydraulic cement, and combinations thereof. In some embodiments, the binder is a non-cementitious binder and may comprise steel slag, fly ash, bottom ash, stainless steel slags, and other materials that are rich in CaO and/or MgO, calcium-silicate content, and combinations thereof. In one particular example, the binder is a non-cementitious binder and comprises less than 5%, less than 4%, less than 3%, less than 2%, or less than 1% by weight of cement.

For example, steel slag can be used herein as the sole component of a binder or the main component of a binder together with a proportion of cement, if needed, to allow for the production of carbonated precast concrete products wherein carbon dioxide is used as the curing agent. In other words, all or a majority of the cement is replaced by steel slag. Carbon dioxide is also applied to promote strength, cure, and activate the slag.

In one embodiment, the binder consists of steel slag. In some cases, the binder includes steel slag and another suitable component.

In one embodiment, the binder is essentially comprised of steel slag. The term "essentially comprised of" as used herein can mean, in one example, at least 90%, at least 91%, at least 92%, at least 93%, at least 94%, at least 95%, at least 96%, at least 97%, or at least 98% by weight. In some cases, the binder may include a majority (e.g., more than 50% by weight) of steel slag.

In one embodiment, the binder comprises steel slag and cement in a weight ratio of steel slag to cement of about 1:20, about 1:15, about 1:10, 1:5, from about 1:20 to about 20:1, from about 1:10 to about 10:1, or from about 1:5 to about 5:1. Alternatively, in some embodiments, the weight ratio of steel slag to cement is about 20:1, or about 15:1 or about 10:1 or about 5:1.

In a further embodiment, especially in a multilayered product as defined herein, the binder in the top/external layer is consisting of steel slag or is comprising essentially of steel slag, or is comprising a steel slag to cement in a weight ratio of about 1:20 to about 20:1 or the weight ratio of steel slag to cement is about 20:1, or about 15:1 or about 10:1 or about 5:1.

In one embodiment, the weight ratio of the binder (such as any or all of steel slag, cement and other carbonatable materials) to the total weight of the composition comprising the aggregate+binder+water+additives, ranges from about 0.20 to about 0.60, preferably from about 0.25 to about 0.50 or more preferably from about 0.30 to about 0.50.

Cement

In this disclosure, the following non-limiting list of cements can be used to produce carbonated precast concrete: Portland cement (Type I-Type V); Portland-limestone cement; rapid hardening cement; quick setting cement; low heat cement; blast-furnace slag cement; Portland-slag cement; high alumina cement; white cement; colored cement; Pozzolanic cement (Portland-Pozzolan Cement); air entraining cement; hydrographic cement; non-hydraulic cement, and ternary blended cement.

As used herein, the cements that are useful are those that contain calcium silicate phases, specifically $C_3S$, that enable them to gain strength when reacted with water. The presence of calcium silicate phases secures the short term and long term strength development.

Steel Slag and Stainless Steel Slag

"Steel slag" herein refers to the slag by-product produced from making steel. Steel slag may include slag produced from Basic Oxygen Furnaces (BOF), also known as slag from the Linz-Donawitz (LD) process, LD slag. Steel slag may also include slag produced from Electric Arc Furnaces (EAF). Steel slag as used herein may further include ladle slag. Steel slag can be a combination of above slags. It will be understood that "steel slag" as used herein excludes iron slag and blast furnace slag that are typically generated during iron production and that may be used in making cement, such as pozzolanic slag.

"Ladle slag" as used herein refers to a type of steel slag. Ladle slag is produced as a by-product from a ladle refining operation. In various steel making processes, molten steel produced in an EAF or BOF process undergoes an additional refining process based on the quality of the desired steel.

"EBH slag" as used herein refers to EAF-BOF Hybrid, which is a type of steel slag formed of a mixture of EAF and BOF produced slags.

Stainless steel slag may include slag generated from the stainless steel production. Stainless steel slag is mainly generated from the argon oxygen decarburization (AOD) and/or ladle metallurgy (LM) process.

Chemical Composition of Steel Slag:

In one embodiment, the steel slag used herein has a cumulative calcium silicate content (ex: $CS+C_2S+C_3S$ phase concentration) of at least about 15% by weight.

In one embodiment, the steel slag used herein has a cumulative calcium silicate content (ex: $CS+C_2S+C_3S$ phase concentration) of at least about 20% by weight.

In one embodiment, the steel slag used herein has a cumulative calcium silicate content (ex: $CS+C_2S+C_3S$ phase concentration) of at least about 30% by weight.

In one embodiment, the steel slag used herein has a cumulative calcium silicate content (ex: $CS+C_2S+C_3S$ phase concentration) of at least about 40% by weight.

In one embodiment, the steel slag used herein has a $SiO_2$ content of at least about 6% or more preferably at least about 15% by weight.

Chemical Composition of Stainless Steel Slag:

In one embodiment, the stainless steel slag used herein has a $SiO_2$ content of at least about 15% or more preferably at least about 20% by weight.

In one embodiment, the stainless steel slag used herein has a calcium oxide content of at least about 30% or more preferably at least about 35% by weight.

Physical Characteristics of Steel Slag:

The steel slag may include a mixture of coarse slag pieces and fine slag pieces. Coarse slag pieces may have a Blaine fineness less than about 50 $m^2$/kg and fine slag pieces may have a Blaine fineness greater than about 50 $m^2$/kg. The coarse slag pieces, the fine slag pieces, or both may be land-filled as an outcome from typical steel making process. Received steel slag originating from waste (such as land-fill and/or industrial waste) may optionally be refined.

Refining the steel slag may include filtering the received steel slag to separate fine slag pieces from coarse slag pieces.

Alternatively, or additionally, refining the received steel slag may also include pulverizing the steel slag to a fine powder. In some exemplary embodiments, the filtered fine pieces are pulverized while coarser pieces are not pulverized. For example, for EAF steel slag, the slag may be pulverized to a Blaine fineness of at least 50 $m^2$/kg, and preferably about 180 $m^2$/kg. For example, for EBH steel slag (mix of EAF and BOF and ladle slag), the slag may be pulverized to a Blaine fineness of at least 100 $m^2$/kg and preferably about 240 $m^2$/kg. In other exemplary embodiments, the steel slag may be pulverized to a finer size. In another example, at least fifty percent of ground slag to be smaller than 100 microns, D(50)<100 microns.

Aggregates

The aggregates can be normal weight and lightweight of natural origin or man-made materials. They can be divided into coarse and fine aggregates according to their sizes. The type, proportion, and size of coarse and fine aggregates vary with their availability, cost and gradation, and also with the required workability of concrete mix, as well as the desired surface texture and properties of carbonated precast concrete. In some embodiments, fine aggregates have less than 5% particles with a diameter greater than $\frac{3}{8}$". In some embodiments, coarse aggregates have a diameter greater than $\frac{1}{4}$". In a further embodiment, coarse aggregates have a diameter greater than $\frac{1}{2}$". In some embodiments, the term "normal weight" as used herein refers to naturally-occurring or crushed gravels or sand, from limestone, granite, etc., with a specific gravity about 2.7. In some embodiments, the term "lightweight aggregates" as used herein refers to natural or artificial particles with a specific gravity in the range of about 0.3 to about 1.9. Herein, the expression "about" implies a variation of plus or minus 10% of a value.

In one embodiment, the weight ratio of the aggregate to the total weight of the composition comprising the aggregate+binder+water+additives, ranges from about 0.3 to about 0.8, preferably from about 0.4 to about 0.7 or more preferably from about 0.40 to about 0.65.

Additives

Additives for use herein include, but are not limited to, air entraining admixture, water reducing admixture, shrinkage reducing admixture, corrosion inhibiting admixture, accelerating or retarding admixture, viscosity modifier, pigment, water repellent admixture and other natural or chemical additives. Further ingredients/additives include fibers (such as Euclid's PSI Multi-Mix 80) that may be added in formulating carbonated precast concrete according to its final application. Additives can also be mineral admixtures.

Water reducing admixture is added to the concrete mixture in order to increase the compressive strength, reduce water content, decrease the porosity, and reduce the water permeability. The water reducing admixture is classified as plasticizer or superplasticizer (that is a polycarboxylate-based water reducer). Any water reducing admixture that is capable of reducing the required water content by up to about 50% or increasing the compressive strength by up to about 60% can be used as water reducer in the current innovation. The admixtures used in this innovation should meet the requirements of ASTM C494 (Standard Specification for Chemical Admixtures for Concrete, ASTM International, West Conshohocken, PA, 2019).

Water repellent admixtures are designed to provide integral water repellency to concrete by affecting the capillary action of water into or out of the concrete. Water repellent admixtures can perform as static pore pluggers, creating a more difficult pathway for water migration, or can perform as reactive chemicals, forming "in situ" hydrophobic materials that not only plug pores, but also chemically repel water from concrete surfaces.

In certain embodiments of the present disclosure, an additive in accordance with the description herein is present in a conditioned demolded product (i.e. a conditioned article), or a portion thereof, intended to undergo the step of surface moisturizing as described herein and said additive is an air entraining admixture.

In one embodiment, the weight ratio of the air entraining admixture, as additive, to the total weight of the composition comprising the aggregate+binder+water+additives, ranges from about 0.0001 to about 0.001, or from about 0.0002 to about 0.0008 or from about 0.0004 to about 0.0006.

In certain embodiments, water repellent admixture is only present in a conditioned demolded product (i.e. the conditioned article), or a portion thereof, such as in a multilayered product, not intended/requiring to undergo the step of surface moisturizing as described herein.

In certain embodiments, water repellent admixture is present in the composition comprising binder(s), aggregates and water in a weight ratio (relative to the total weight of the composition) of at least about 0.005, or at least about 0.006, preferably at least about 0.007, or at least about 0.008, or at least about 0.009 or at least about 0.010.

In certain embodiments, water repellent admixture is present in the composition comprising binder(s), aggregates and water in a weight ratio (relative to the total weight of the composition) of at least about 0.005 and up to about 0.009-0.010.

Water to Binder Ratio

Water-to-binder ratio depends on the manufacturing process (wetcast method or drycast method), the contents of binder and aggregates, and use and dosage of water reducer in a mix design. Generally, the water-to-binder ratio varies from about 0.10 to about 0.50 (weight basis ratio).

In one embodiment, the water-to-binder ratio ranges from about 0.10 to about 0.25.

In one embodiment, the water-to-binder ratio may be at least about 0.10, or at least about 0.11, or at least about 0.12, or at least about 0.13, or at least about 0.14, or at least about 0.15, or at least about 0.20 or at least about 0.25.

In one embodiment, the weight ratio of the water to the total weight of the composition comprising the aggregate+binder+water+additives, ranges from about 0.01 to about 0.10, preferably from about 0.05 to about 0.10 or more preferably from about 0.06 to about 0.08.

Referring to FIG. 1, there is provided a process 100 for making a carbonated precast concrete product according to the present disclosure. As will be described in more detail below, the process 100 includes a step 102 of mixing the raw materials, which include the binder(s), aggregate, water, and some optional additives. The process 100 includes molding the mixture of the at least one binder, aggregate, and water into a molded intermediate. In the embodiment shown, the molding of the mixture into the molded intermediate includes a step 104 for forming the mixture to obtain a formed intermediate and a step 106 of consolidating the formed intermediate to obtain a consolidated intermediate, which may correspond to the molded intermediate. An optional step 108 of performing an initial curing of the molded intermediate may be carried. A step 110 of demolding the molded intermediate to obtain a demolded intermediate is performed. The demolded intermediate has a first water-to-binder ratio. A step 112 of conditioning the demolded intermediate to provide a conditioned article having a second water-to-binder ratio. The second water-to-binder ratio of the conditioned article is less than the first water-to-binder ratio of the demolded intermediate. A step 114 of moisturizing a surface of the conditioned article to obtain a moisturized product. The step 114 of the moisturizing causes a weight gain of the conditioned article. A first portion of the moisturized product has a third water-to-binder ratio that is greater than a fourth water-to-binder ratio of a remainder of the moisturized product. In some embodiments, the first portion having the third water-to-binder ratio may correspond to an outer layer or outer face of the moisturized product and the remainder of the moisturized product having the fourth water-to-binder ratio may correspond to a core of the moisturized product being at least partially surrounded or covered by the outer layer or outer face. An optional step 116 of air drying the moisturized product may also be included, followed by a step 118 of curing the moisturized product with carbon dioxide. The optional steps are shown with dashed lines in FIG. 1. Each of the steps 102 to 118 are described in more detail herein below.

Mixing of Components

The step of mixing 102 is performed with at least one binder material, aggregate, water and optionally additives such as admixtures. In one embodiment, prior to the step of mixing 102, the method is comprising a step of a) of providing a dry part and a liquid part, said dry part is comprising at least one aggregate material and at least one binder material, and said liquid part is comprising water and optionally additives and combining the dry and liquid parts.

Additives and other ingredients can be optionally introduced into the mix in some embodiments and if needed as a function of the intended use of the concrete product.

Forming and Consolidating

The step of forming 104 is comprising adding a sufficient amount of mixed material containing binder, suitable aggregate, water and optionally additives by any known means into a mold for forming the components into a desired shape. Although "mold" or "molding" is used herein, the expression is contemplating any hollow form or matrix for providing a shape such as a frame/mold and then optionally levelled. In other words, the mixture may be molded in such a way as to define an inner cavity.

The step of consolidating 106 is comprising a consolidation of the formed intermediate to the desired thickness, shape and density, for example using vibrating or compacting or compressing or combined forces. The desired thickness, shape, and density can be selected depending on the desired application as known in the art.

The steps of forming 104 and consolidating 106 together may be referred to herein as molding the product. In other words, the step 104 of forming and the step 106 of consolidating may be regarded as two sub-steps of a step of molding the mixture.

In one embodiment, prior to the step 104 of forming, the method is comprising a further step of mixing at least one binder material, aggregate, water and optionally additives to provide a substrate mixture, wherein said mixing can be conducted before, at the same time or after the step 102 of mixing. In one embodiment, the method comprises a step of forming said substrate mixture to provide a formed intermediate, wherein said forming step can be conducted before, at the same time or after step 104. In a further embodiment, one or more of steps 102 and 104 the mixing of the substrate mixture and the forming of the substrate may be repeated. In further embodiments, each of said mixtures of at least one binder material, aggregate, water and optionally additives may be comprising the same or different ratios of those components. However, at least one of those mixtures, especially the one undergoing the surface moisturizing step 114, is comprising a binder other than cement, such as a slag binder, or preferably steel slag. Within the above embodiments, each of the molded product (i.e. molded intermediate), demolded product (i.e. demolded intermediate), conditioned demolded product (i.e. conditioned article), moisturized pre-cured molded product (i.e. moisturized product) and carbonated precast concrete product will be multilayered (such as a two or more layered product).

Initial Curing (Optional)

In some cases, especially when precast concrete is fabricated with a wet cast process, the step 108 of initially curing the molded intermediate is optionally performed to offer the molded intermediate a satisfactory initial strength before it is taken out of the mold at 110. Precast concrete relies on the hydration/setting of binder or other physical/chemical/activation to achieve the desired strength gain in this initial curing stage which, for example, lasts from 2 hours up to a few days.

Conditioning (Reducing the Quantity of Water in De-Molded Precast Concrete)

Although carbonation curing can occur immediately after precast concrete is de-molded, it is common to condition the consolidated concrete for a certain period of time before carbon dioxide gas is introduced. This step 112 of conditioning begins after the step 114 of demolding the molded intermediate and before the step 118 of curing the demolded intermediate with $CO_2$. The step 112 of conditioning involves the controlled removal of excess water. Its main purpose is to facilitate a quick and uniform carbonation reaction within concrete by removing excessive water. A surplus of water can limit the reaction by blocking the diffusion of $CO_2$ to the reactants, while insufficient water content can cause water starvation, halting the reaction. Thus, an optimal water content may be achieved prior to carbonation for an optimal carbonation.

The step 112 of conditioning is conducted on the demolded intermediate (optionally after an initial curing) product after the step 110 of demolding. The step 112 of conditioning may be carried at room temperature, temperature of 15-25° C. and humidity of 30-60%, and with or without the assistance of forced air circulation. The duration of conditioning may vary from 10 minutes up to 24 hours or longer. This step 112 of conditioning step may help to reduce the moisture content of precast concrete through water evaporation. The released moisture leaves numerous pores inside the consolidated precast concrete, which may be critical for achieving a uniform carbonation throughout the whole precast concrete product with a desired $CO_2$ uptake. A relatively great $CO_2$ uptake and a uniform carbonation distribution may be very important to the physical-mechanical properties of carbonated precast concrete product. In one embodiment, 20-70%, preferably 30-60% and especially 40-50% by weight, of the initial moisture in the mixture is taken out of precast concrete at the end of the step 112 of conditioning. Other known ways of reducing the moisture, e.g. heat, can be alternatively used during the conditioning step.

Exposing Surface of Product to an Aqueous Medium

The process 100 of the present disclosure includes the step 114 of moisturizing a surface of the conditioned article. The step 114 of moisturizing includes exposing at least one surface of said conditioned article to an aqueous medium to cause a weight gain. After the molded product is conditioned 112, the moisture content, or in other words the ratio of water to binder, of precast concrete is reduced. A sufficient moisture content in the matrix may allow an uniform carbon dioxide penetration and a satisfactory $CO_2$ uptake and a satisfactory performance for carbonated precast concrete. However, there is a drawback associated with the conditioning as described in the art, which is that the outer (exposed) surface of molded product loses moisture much more quickly than the interior of precast concrete. This is believed to result in a lower moisture content on the outer surface when the moisture content in the interior part is at an ideal level. The shortage of moisture on the outer surface makes the subsequent carbonation curing process incomplete on the outer surface, because the curing needs sufficient amount of water to facilitate the reaction between carbon dioxide and the calcium-silicate phases or oxides or hydroxides of calcium and magnesium.

In operating the process defined herein, it is desired that the surface moisture content of the outer surface is increased to an adequate level prior to carbonation curing. This may ensure that a satisfactory degree of carbonation reaction can be achieved through the whole volume of the precast concrete product.

In the step 114 of moisturizing the surface of the conditioned article by exposing the surface of said conditioned article to an aqueous medium, the surface moisture content can be increased by applying the aqueous medium (i.e. a water-containing material or phase) to at least one surface of the conditioned article. This aqueous medium can be solely water, or a water-based solution, or a water-based slurry. There is no specific requirement for the temperature of this water-containing material when it is applied in the surface-moisturizing process, although a temperature close to room temperature (i.e. from about 15 to about 25° C.) is preferred. The aqueous medium for use herein to cause a weight gain of the surface of the conditioned article, includes any water-containing means (suspension/solution or other phases/material) comprising a sufficient amount of CaO/Ca $(OH)_2$/MgO, capable of delivering water moisture to the surface and that is suitable for concrete manufacture. Water soluble chemical solution, such as sodium silicate (water glass), in 1-25% concentration can be used for surface moisturizing as well. A slurry of hydrated cement, steel slag, GGBFS, stainless still slag, lime, non hydrated cement, fly ash, or any material comprising an sufficient amount of CaO/Ca$(OH)_2$/MgO, with a solid content of 1-80%, can also be used for surface moisturizing. When a slurry is used, its solid content can be 1-25%, mass based, although a solid content of 5-10% is preferred. The slurry can be prepared by adding CaO and/or MgO-rich substance to the proportional amount of water, e.g. tap water, at room temperature (15-25° C.) in a container with an agitator equipped. The agitator should be kept running in the slurry preparation and surface-moisturizing processes to maintain a consistent solid content. The prepared aqueous medium should have a pH value between 6.5 and 13.5.

The aqueous medium may be applied using various application methods, include but not limited to, dipping the surface partly or wholly in a water-containing liquid, or spraying the aqueous medium to the surface, or applying the aqueous medium to the surface with a roller or similar devices. If dipping is chosen, the submersion duration of precast concrete in water-containing liquid can be 1 second to 5 hours, preferably 3-5 seconds.

No matter what type of application method is chosen, the moisturized product may achieve a weight gain of at least 10 $g/m^2$ during the step 114 of the moisturizing, preferably at least 50 $g/m^2$, preferably between 50 and 350 $g/m^2$ or between 75 and 325 $g/m^2$ (based on the total moisturized surface area of precast concrete), after the surface-moisturizing treatment is completed.

$CO_2$ Curing and Optional Air Drying

After the surface moisturizing step 114, the moisturized product can be cured (carbonated). The step 118 of curing may be done immediately after the step 114 of moisturizing. This is done at the step 118 of curing with the carbon dioxide. In some embodiments, considering the needed waiting time in carbonated precast concrete manufacturing process, such as transporting the surface-moisturized precast concrete and loading it to a carbonation curing chamber, the step 116 of air-drying the moisturized product after the step 114 of moisturizing can optionally be performed before the step 118 of curing. This period can last up to 1 hour, preferably 5-20 minutes. During this period, surface-moisturized precast concrete should not be exposed to excessively hot, dry, or windy environment. If more than 1 hour of air-drying time is needed, the surface-moisturizing activity should be delayed. Otherwise, the surface-moisturized precast concrete should be covered with a plastic sheet or similar material to prevent further loss of moisture prior to carbonation curing. In some embodiments, the air temperature ranges from 15 to 40 degrees Celsius, preferably about 22 degrees Celsius. The relativity humidity may range from 30% to 90%, preferably about 50%. The airflow speed may be from 0.1 m/s to 100 m/s, preferably about 2 m/s.

In some embodiments, the surface-moisturized precast concrete is put into a pressure chamber where carbonation curing takes place. Carbon dioxide gas with a purity between 5-99.9% is introduced into the sealed pressure chamber. Concrete is cured with the gas at the atmosphere pressure or above the atmospheric pressure. In the case of above atmospheric pressure, the pressure of carbon dioxide gas inside the chamber is adjusted to 0.07-0.689 MPa (0.1-100 psi) during the carbonation curing process which lasts for at least 5 minutes, preferably 2-24 hours.

Layered Carbonated Product Structure

As discussed herein, the process 100 of the present disclosure may provide a positive effect on the certain mechanical and durability properties of carbonated precast concrete products, specifically the abrasion and freeze and thaw resistance. Such process 100 may therefore have the ability of providing a product with combined beneficial properties. For example, a layered carbonated product structure may be prepared. The present disclosure contemplates the manufacture/use of multiple layers in a given product depending on the needs. The carbonated product may contain at least a first/external/top layer that, according to the product or configuration, may be considered an external coat and a second layer, that may be referred to as second/inner/bottom/substrate layer, depending on the product or configuration. The composition of the two layers may be different, with regard to the binder (although it is contemplated that at least the binders herein should preferably be used), the aggregate, mixture proportions, additives and the other optional components. The layers may additionally have different thicknesses and their relative size proportions may therefore be different. The two layers may have different properties, and the first/external/top layer at least has one improved property relative to the second/inner/bottom/substrate layer, said property being at least one of abrasion resistance and freeze and thaw resistance.

Figure 2:
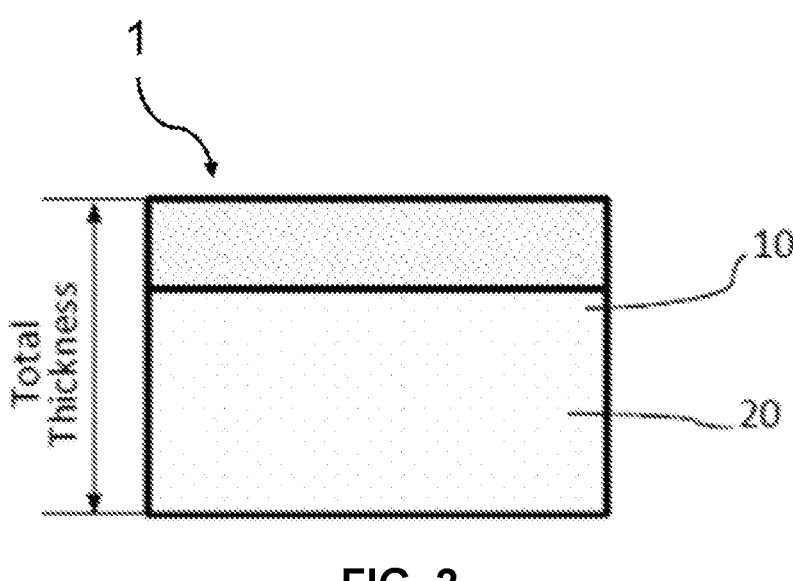
FIG. 2 is a schematic view of a precast concrete product having two different layers through its thickness.

As illustrated in FIG. 2, an exemplary embodiment of a carbonated precast concrete product 1 may be composed of two different layers 10, 20 along its thickness. On the top is a denser and stronger/more durable precast concrete layer 10. Underneath the top layer 10 is a substrate layer 20. In one embodiment, the thickness of the top layer 10 may be less than half the total thickness of the concrete product 1.

In embodiments of the top layer: 1) its thickness can be 5-20 mm, preferably 6-13 mm; 2) it may use the same type of binder as the substrate layer 20; it can also use a different type of binder from the substrate layer 20; 3) if it uses the same type of binder as the substrate layer 20, the top layer 10 may use the same binder content as the substrate layer 20 but has a higher first water-to-binder ratio, the top layer 10 may also use a greater binder content than the substrate layer 20 but a first water-to-binder ratio similar to or greater than the latter; such proportioning practices may be beneficial for the improvement of abrasion resistance of carbonated precast concrete; 4) the surface-moisturizing step described above is optionally advised to apply to this layer or the whole part of precast concrete after the conditioning process is completed; 5) if the step 214 of surface-moisturizing is applied, water repellent admixture should not be added into precast concrete mixture in order to facilitate the moisture-taking process; and 6) it is designed as the surface to withstand the main wear and tear actions during the service of carbonated precast concrete. Embodiments of the substrate layer 20 are: 1) the addition of at least 0.1% of binder mass, preferably 1.5-2.0%, water repellent admixture; 2) a binder content not greater than the top layer 10 to save material cost; 3) a lower water to binder ratio, in mass/mass, than the top layer 10 in order to compensate for the reduced carbon dioxide gas permeability in the denser top layer 10; and 4) a thickness greater than that of the top layer 10. The high dosage of water repellent admixture may improve both the freeze-thaw resistance and water absorption of the substrate layer 20. It may also offer a dimensionally stable substrate, which may be important to the durability of the relatively thin top layer.

In one embodiment, there is provided a method for making a carbonated precast concrete product comprising:

1) mixing at least one binder material, aggregate, water and optionally additives, preferably, the binder is consisting of cement or is consisting essentially of cement, or is comprising a cement to steel slag or other carbonatable material ratio of about 1:20 to about 20:1 or the weight ratio of cement to steel slag or other carbonatable material is about 20:1, or about 15:1 or about 10:1 or about 5:1;

1A) mixing at least one binder material, aggregate, water and optionally additives to provide a substrate mixture, preferably, the binder is consisting of steel slag, and/or any other carbonatable material, or is consisting essentially of steel slag, or is comprising a steel slag to cement ratio of about 1:20 to about 20:1;

wherein said step 1A) is conducted before, at the same time or after step 1);

2) forming the mixed at least one binder material, aggregate, water and optionally additives of step 1) to provide a formed product;

2A) forming said substrate mixture to provide a formed substrate mixture, wherein said step 2A) can be conducted before, at the same time or after step 2);

wherein one or more of steps 1) and 2) and/or 1A) and 2A) are optionally repeated and optionally, each of said mixed at least one binder material, aggregate, water and optionally additives may be comprising the same or different ratios of same or different components;

3) consolidating the formed product of steps 2) and 2A) into a molded product having a first water-to-binder ratio;

4) demolding said molded product of step 3) having said first water-to-binder ratio to provide a demolded product;

5) conditioning said demolded product of step 4) to provide a conditioned demolded product having a reduced amount of water relative to the molded product having a first water-to-binder ratio; and 6) curing said conditioned demolded product of step 5) with carbon dioxide.

Figure 3:
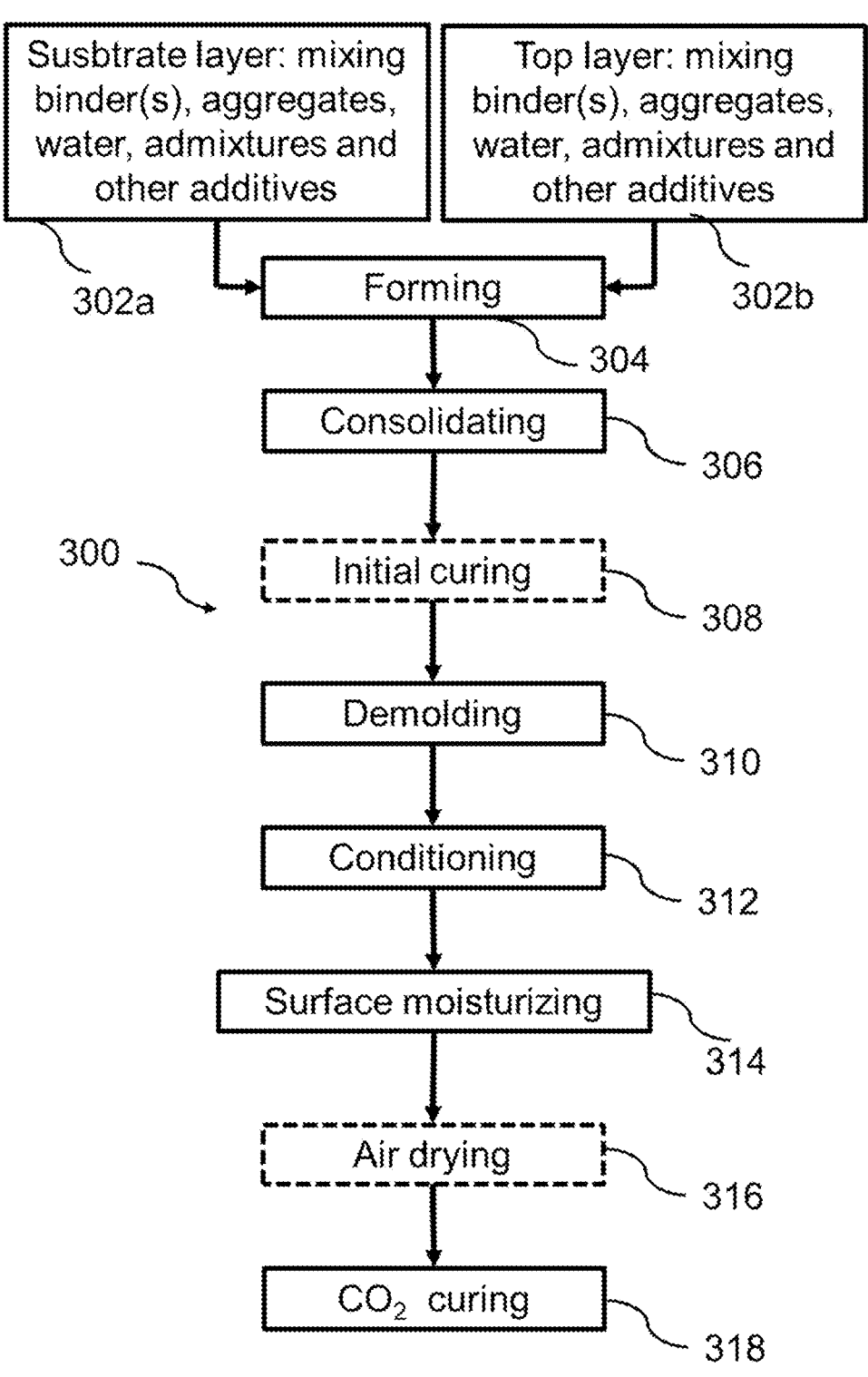
FIG. 3 is a flow chart illustrating a process for manufacturing a two-layer carbonated precast concrete product as shown in FIG. 2.

Referring now to FIG. 3 there is provided a process 300 for making a carbonated precast concrete product having a substrate layer and a top layer. As will be described in more detail below, the process 300 includes a step 302a of mixing binder(s), aggregates, water, admixtures, and other additives for the substrate layer (substrate mixture) and a step 302b of mixing binder(s), aggregates, water, admixtures, and other additives for the top layer (top or external layer mixture). A step 304 of forming the concrete product with a substrate layer from the substrate mixture and a top layer with the top layer mixture (multilayer concrete product) to obtain a multilayer molded intermediate. A step 306 of consolidating the multilayer molded intermediate to obtain a multilayer consolidated intermediate. An optional step 308 of performing an initial curing of the multilayer consolidated intermediate. A step 310 of demolding the multilayer consolidated intermediate to obtain a demolded multilayer intermediate. The demolded multilayer intermediate has a first water-to-binder ratio for the substrate and a second water-to-binder ratio for the top layer. A step 312 of conditioning the demolded multilayer intermediate to obtained a conditioned multilayer article. At least the top layer of the conditioned multilayer article has a reduction in its water-to-binder ratio during the conditioning at 312. In some cases, following the step 312 of the conditioning of the demolded multilayer intermediate, the water-to-binder ratios of both of the substrate and the top layer decrease below their respective first and second water-to-binder ratios. A step 314 of moisturizing at least one surface of the conditioned multilayer article (e.g. the top layer) to obtain a moisturized multilayer product. Following the step 314 of the moisturizing of the top layer, the top layer has a third water-to-binder ratio that is greater than the second water-to-binder ratio. An optional step 316 of air drying the moisturized multilayer product. And a step 318 of curing the moisturized multilayer product with carbon dioxide. The optional steps are shown with dashed lines in FIG. 3. Each of the steps 302a/302b to 318 are described in more detail herein below.

FIG. 3 illustrates another process of manufacturing a two-layered carbonated precast concrete product 300. The process 300 may be used to manufacture a multilayered product. The process 300 includes a step 302 a of mixing components of the substrate layer 20 (FIG. 2) and a step 302b of mixing components of the top layer 10 (FIG. 2). As mentioned earlier, the step 302a of substrate layer mixing and the step 302b of top layer mixing may use different binders, different binder contents and different water to binder ratios. In addition, the substrate layer 20 may have a relatively high dosage of water repellent admixture. Air entraining admixture is recommended for the top layer 10, with a dosage varying with the suppliers. However, air entraining admixture may not be necessary in the substrate layer 20, due to the extensive use of water repellent admixture in that layer 20. Optionally, micro-fiber can be added into the mix of the top layer 10 at a dosage of 0.2-0.5% (on the total volume of raw materials). The addition of micro-fiber may reduce the cracking potential but may increase the abrasion resistance of carbonated precast concrete. Furthermore, the top layer 10 may contain no water repellent admixture, if the step 314 of surface-moisturizing is implemented. After being batched and mixed separately, the top layer 10 and substrate layer 20 mixtures are transported to the forming/molding station. Then follows the step 304 of forming and the step 306 of consolidating by adding the two layers into the mold following the required amounts and sequence. It should be mentioned that the top layer mixture can be added into the mold at first, so can the substrate layer mixture. In order to achieve a strong and durable bond between these two layers 10, 20, the second layer mixture should be added immediately onto the levelled but not compacted first layer material. Other techniques including putting a mesh on the top of first layer or roughen up the first layer surface before casting the second layer can be implemented for a better bonding between these two layers. The step 308 of initial curing is optionally performed as described herein with reference to the step 108 described above with reference to FIG. 1. Furthermore, the step 310 of demolding and the step 312 of conditioning are performed as described herein above with reference to steps 110 and 112 of FIG. 1. After the step 312 of conditioning, precast concrete can be subjected to the step 318 of carbonation curing without the use of the step 314 of surface-moisturizing, if the top layer 10 contains cementitious binder, e.g. hydraulic cement. Otherwise, the top layer 10 or the whole precast concrete undergoes the step 314 of surface-moisturizing with the methods described herein above. Due to the addition of a large amount of water repellent admixture, the substrate layer 20 may have a very strong hydrophobicity, making the step 314 of surface-moisturizing unnecessary for the substrate layer 20. After the step 314 of surface moisturizing step, if required, precast concrete may optionally undergo the step 316 of air-drying briefly before it is subjected to the step 318 of carbonation curing. The duration of this air-drying period and the actions that are taken when the air-drying duration is longer than 1 hour are the same as the ones described earlier, for example in FIG. 1 step 116. Precast concrete with a two-layer structure is loaded to a pressure chamber and then subjected to carbonation curing at the step 318 there. The step 318 of carbonation curing includes parameters for precast concrete with a two-layer structure are the same as described herein, for example those described in FIG. 1 step 118.

Besides the added surface-moisturizing stage, adding sufficient amount of water repellent admixture into precast concrete mix may also be an effective way to improve the freeze-thaw resistance of carbonated precast concrete. Freeze-thawing damage may be prevented if water or de-icing salt solution cannot penetrate into carbonated precast concrete. By adding sufficient amount of water repellent admixture, the water absorption of carbonated precast concrete in a saturated condition may be reduced significantly, resulting in an improvement in freeze-thaw resistance. Normally, the suggested dosage of water repellent admixture for precast concrete is below 0.4% (based on the mass of binder). Such a low dosage of water repellent admixture may have very limited effect on the freeze-thaw resistance of concrete. The processes of the present disclosure may increase the dosage of water repellent admixture to 1.0% or higher.

Carbonated precast concrete with this high water repellent admixture dosage may perform well in freeze-thawing test, without the addition of the above-mentioned surface-moisturizing step.

Figure 4:
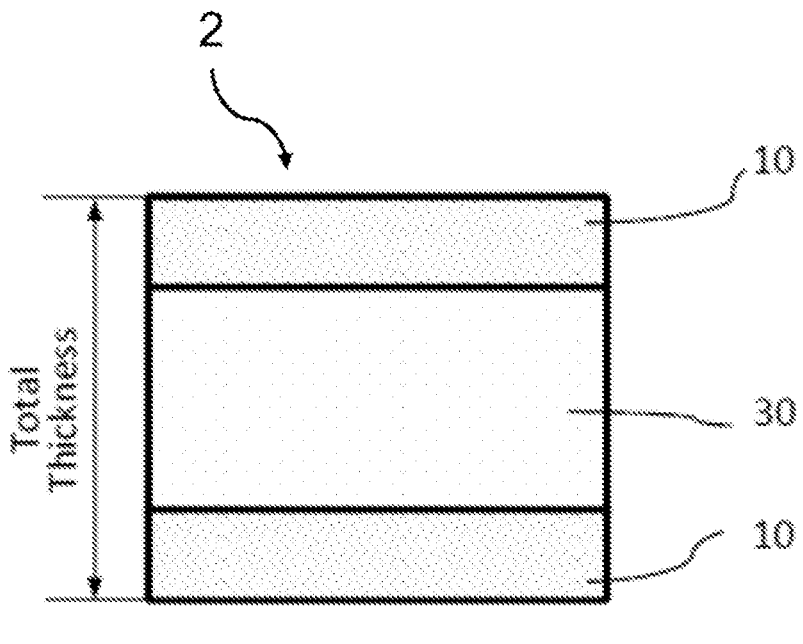
FIG. 4 is a schematic view of a precast concrete product having three layers through its thickness.

Referring now to FIG. 4, the above described two-layer structure design can be further extended to a three-layer structure 2 design. The top and bottom parts of this design are the denser and stronger/more durable precast concrete layers 10. Between these two layers is the core layer 30. Precast concrete on the top and bottom layers 10 may be prepared with the same way as the first/external/top layer 10 of the two-layered precast concrete 1 described herein above with reference to FIG. 2. The core layer 30 may have totally different raw material sources and mix design from the ones used to prepare the second/inner/bottom/substrate layer 20 of the two-layer structure design 1 described herein above with reference to FIG. 2. Such a sandwiched design may bring many benefits to carbonated precast concrete, such as the improvement of flexural performance on the top of durability improvement, a well-balanced structure, the possible reduction of conditioning and carbonation curing time, and the addition of other required functions. The manufacturing process 300 of two-layered carbonated precast concrete presented in FIG. 3 may be adopted for three-layered carbonated precast concrete, with a slight modification on the forming sequence. Accordingly a multilayered carbonated precast concrete 2 can be formed with more than three layers.

In the following examples, carbonated precast concrete products are formulated with some or all of the raw materials listed below:

Steel slag: a mixture of EAF and BOF slag (EBH slag), with an average particle size (D50) of 25 μm and an estimated specific gravity of 3.3; the steel slag has a cumulative calcium silicate content of at least about 20%; wherein the steel slag has a calcium oxide content of at least 20%; wherein the steel slag has a silicon dioxide content of at least about 6%;

Ordinary Portland cement: type I;

Water: tap water;

Aggregates: crushed stone with a specific gravity of 2.7; 100% passing 4.76 mm (No. 4) sieve; 0.25% moisture content and 0.75% water absorption;

Air entraining admixture (AEA): supplied by BASF, product name Micro Air;

Water repellent admixture (WRA): supplied by BASF, product name MasterPel 240;

Hydrated lime: a white powder of calcium magnesium tetrahydroxide, supplied by DAP Canada.

Compressed $CO_2$ in cylinders with a purity >99.9% is used for carbonation curing.

The properties of the manufactured carbonated precast concrete are evaluated and compared with the specifications of either ASTM C1372 for segmental retaining wall units or ASTM C936 for concrete interlocking paving units. These examples only intend to demonstrate that desirable characteristics may be obtained by the carbonated precast concrete made with the methods of the present disclosure. Neither the raw materials and processes, nor the products and applications will be limited to the ones given in the examples.

Example 1

Precast concrete sample A was prepared with the mix design shown below in Tables 1a and 1b below TABLE 1a

| Mixture composition of sample A Mix design for sample A | |
| --- | --- |
| Ingredients | Weight |
| Steel slag | 147.1 g |
| Aggregates | 319.9 g |
| Water | 31.2 g |
| AEA | 0.18 g |

TABLE 1b

| Composition of Sample A | | | | | |
| --- | --- | --- | --- | --- | --- |
| Ex. mix ratio | total | binder | aggregate | water | additives |
| 1 | 498.38 | 0.295 | 0.641 | 0.06 | 0.0004 |
| w/b*: 0.21 | | 29.5% | 64.1% | 6% | 0.04% |

*water to binder ratio

The raw materials were mixed together with a mixer for 5 minutes, formed and consolidated under compaction and vibration to the desired density. After being demolded, precast concrete sample A was conditioned in front of a commercial fan with an air flow rate of 43 m³/min for 2 hours at room temperature, achieving a 50% loss of its initial moisture content. After that, the surface moisturizing step was conducted by completely submerging sample A in water for 1 second, achieving a weight gain of 189 g/m². Surface-moisturized precast concrete was then air-dried at ambient temperature for around 5 minutes before it was loaded into a pressure chamber for carbonation curing. The weight gain becomes 172 g/m² before carbonation curing was commenced. Adjusted to a pressure of 0.1 MPa (15 psi), carbon dioxide gas was introduced into the sealed pressure chamber. The duration of carbonation curing was set to 24 hours. After carbonation curing, the following properties of carbonated precast concrete were evaluated:

Density, water absorption and compressive strength—in accordance with ASTM C140 (ASTM, 2018c);

Freeze-thaw resistance—in accordance with ASTM C1262;

Abrasion resistance—in accordance with ASTM C944.

During the freeze-thaw resistance test, carbonated precast concrete sample was partly submerged in 3% NaCl solution and subjected to 40 repeated freeze-thawing cycles, with loose particles collected and saline solution changed every 10 cycles. Although ASTM C1372 requires an accumulated mass loss of not greater than 1% after 100 cycles of freeze-thawing tests for segmented concrete retaining wall units, it is generally believed that this specification is for concrete retaining wall partly submerged in water, instead of in a de-icing salt solution. Due to the complicated physical and chemical alterations made by a de-icing salt solution, concrete often experiences quicker, and more severe deteriorations when a de-icing salt like NaCl is presented in the freeze-thawing process. Because of this difference, many state transportation departments specify an acceptance criterion of not greater than 1% accumulated mass loss after 40 cycles of freeze-thawing tests for concrete retaining wall when 3% NaCl is presented. Generally, if carbonated precast concrete can satisfy this criterion, it should easily conform to the requirement of not greater than 1% mass loss after 100 cycles of freeze-thaw testing in water.

For comparison purpose, conventional carbonation precast concrete sample B was made with the identical formulation as sample A but lacking the surface-moisturizing step. Its conditioning-resulted moisture loss is 56%. Its physical-mechanical properties and durability were also evaluated after carbonation curing.

TABLE 1c

Key physical-mechanical properties and durability
of surface-strengthened carbonated precast concrete
and conventional carbonated precast concrete

| Properties | Samples | |
|---|---|---|
| | A | B (control) |
| Density (kg/m$^3$) | 2319 | 2364 |
| Water Absorption (kg/m$^3$) | 112 | 116 |
| Compressive Strength (MPa) | 39 | 40 |
| Mass Loss after Freeze-thawing Test (%) | 0.9 | 4.0 |
| Mass Loss after Abrasion Test (g/min) | 0.28 | 3.05 |

TABLE 2

Specifications of ASTM C1372 for segmental retaining wall units

| Properties | Requirements |
|---|---|
| Density (kg/m$^3$) | ≥2000 |
| Water Absorption (kg/m$^3$) | ≤208 |
| Compressive Strength (MPa) | ≥21 |
| Mass Loss after Freeze-thawing Test (%) | ≤1 |

The testing results of both samples A and B are summarized in Table 1c. The obtained testing results are compared with the specifications of ASTM C1372 (Table 2). Due to the strengthened surface by the surface-moisturizing process, sample A has far better freeze-thaw resistance and abrasion resistance than sample B. Without surface-moisturizing step, carbonated precast concrete cannot be accepted for segmental retaining wall application due to its poor freeze-thaw resistance, although its other properties meet the requirements of ASTM C1372. The surface-strengthening effect has made sample A conform to all of the requirements of ASTM C1372 for concrete segmental retaining wall.

Figure 5:
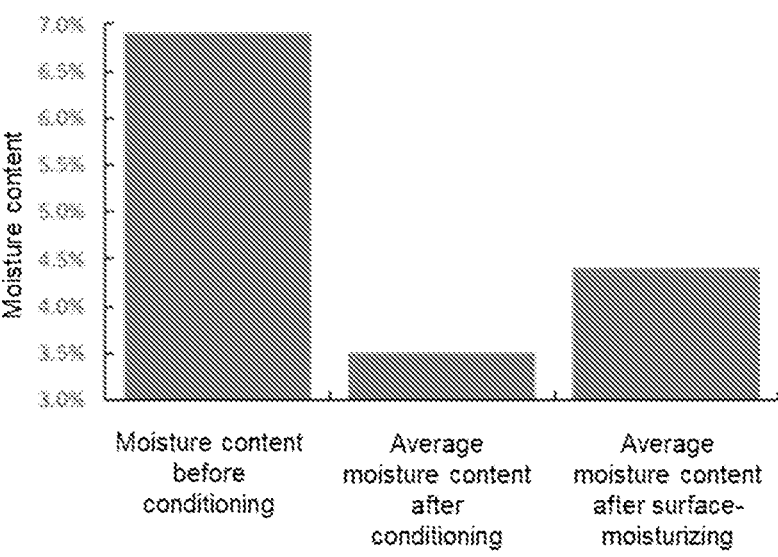
FIG. 5 is a graph illustrating an average moisture contents of precast concrete products at different stages of fabrication using a process of the present disclosure.
Figure 6:
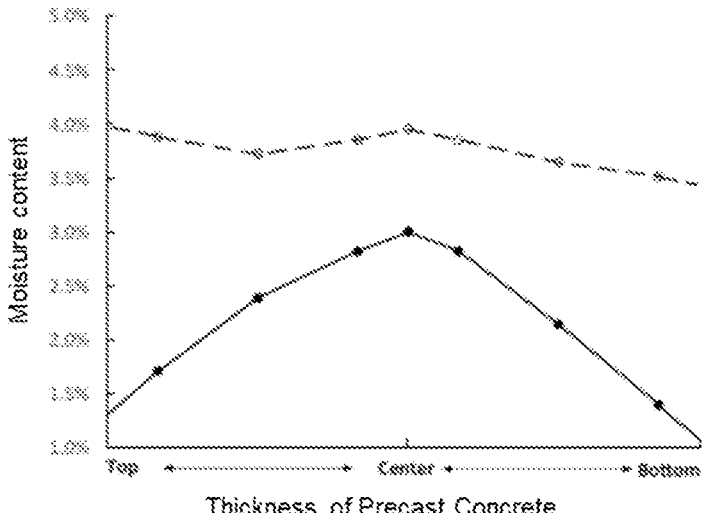
FIG. 6 is graph illustrating a variation of the moisture contents of precast concrete sample, prepared with the mix design of sample A, measured through its thickness after conditioning (solid line) and then after surface moisturizing (dashed line).

The moisture content of precast concrete at different stages of sample fabrication process was monitored and the results are displayed in FIG. 5. Roughly 50% of the initial moisture of precast concrete had evaporated at the end of the conditioning process. The surface-moisturizing process brings some water back to precast concrete, making the moisture loss being about 40% of its initial moisture content. It is not the change of the average moisture content, but the change in moisture content distribution after the surface-moisturizing process that significantly improves the internal and surface quality or freeze-thaw resistance of carbonated precast concrete. The moisture content of the conditioned sample B along its thickness was measured and the results are shown in FIG. 6. From the top surface to the bottom of sample B, the moisture content distributes like a slightly skewed bell curve. In its center, the moisture content was 3%. This moisture content keeps decreasing on its way from the center to the outer surface as a result of the fan-assisted conditioning process. On the outermost part of sample B, the moisture content was reduced to as low as 1%. Such a low moisture content makes the carbonation curing of precast concrete incomplete, because the carbonation reaction requires sufficient water as a reactant. This incomplete carbonation curing on the outer surface, in turn, makes a weak surface for the carbonated precast concrete. This is the reason why sample B was very poor in both freeze-thaw and abrasion resistance.

The moisture content distribution along the thickness of precast concrete was totally modified by the surface-moisturizing process. As shown in FIG. 6, after submersion in water, the moisture content difference between the center and the outer surface of precast concrete was narrowed down to less than 0.5%. This represents a more uniform moisture distribution across the sample thickness. More importantly, the moisture content in the outer surface of precast concrete was increased from the initial 1% to about 4% after the surface-moisturizing process was taken. Actually, a moisture content of around 4% was considered as an optimal value for precast concrete to achieve a maximum degree of carbonation curing. With the help of sufficient amount of moisture on and near the outer surface of precast concrete, the carbonated reaction achieves its highest potential. Therefore, the internal and surface quality of carbonated precast concrete was improved. This is the reason why sample A has much greater resistance to both freeze-thaw and abrasion deformations than sample B.

Example 2

Precast concrete samples were made with the formulation and manufacturing method of Example 1, but the surface-moisturizing method was changed. Instead of being dipped in water, conditioned precast concrete samples were dipped in either 5% cement (i.e. same Portland cement as recited above in the mix composition) slurry (sample C) or 5% hydrated lime slurry (sample D) for 1 second after they were conditioned with a fan for 2 hours. The conditioning-resulted moisture losses are 56% and 55% for samples C and D, respectively. Their weight gains were 248 and 234 g/m$^2$, respectively, after the surface-moisturizing step was completed. The surface-moisturized samples were then air-dried for about 6 minutes before they were subjected to carbonation curing at 0.1 MPa (15 psi) pressure for 24 hours. The freeze-thaw resistance and abrasion resistance of carbonated precast concrete samples were evaluated identically as sample A and the results are recorded in Table 3. Compared with the testing results of conventional carbonated precast concrete (sample B in Table 1), the improvements in freeze-thaw resistance and abrasion resistance are obvious with the proposed surface-moisturizing step.

TABLE 3

Freeze-thaw resistance and abrasion resistance of
surface-strengthened carbonated precast concrete

| Properties | Samples | |
|---|---|---|
| | C | D |
| Mass Loss after Freeze-thawing Test (%) | 0.4 | 0.9 |
| Mass Loss after Abrasion Test (g/min) | 0.49 | 0.47 |

Example 3

Precast concrete samples were made with the formulation and manufacturing method of Example 1, but the surface-moisturizing duration was increased. Instead of being dipped in water for 1 second, conditioned precast concrete samples were dipped in water for either 3 seconds (sample E) or 5 seconds (sample F). After being conditioned in front of a fan for 2 hours, samples E and F loss 55% and 54% of their initial moisture content, respectively. They achieved a weight gain of 231 and 222 g/m², respectively after the surface-moisturizing step. After around 6 minutes of air-drying following surface-moisturizing, they were cured with carbon dioxide gas adjusted to 0.1 MPa (15 psi) pressure for 24 hours. The abrasion resistance of carbonated precast concrete samples was evaluated identically as sample A and the results are recorded in Table 4. Compared with the testing results of conventional carbonated precast concrete (sample B in Table 1), the improvement in abrasion resistance is obvious with the added surface-moisturizing step.

TABLE 4

Abrasion resistance of surface-strengthened carbonated precast concrete

| Properties | Samples | |
|---|---|---|
| | E | F |
| Mass Loss after Abrasion Test (g/min) | 0.77 | 0.33 |

Example 4

Precast concrete samples were made with the formulation and manufacturing method of Example 1, but the surface-moisturizing method is changed. Instead of being dipped in water, conditioned precast concrete samples were dipped in either 25% cement slurry (sample G) or 25% hydrated lime slurry (sample H) or 25% steel slag slurry (sample I) for 1 second. After being conditioned in front of a fan for 2 hours, samples G, H and I loss 47%, 50% and 51% of their initial moisture contents, respectively. They achieved a weight gain of 213, 268 and 258 g/m², respectively, after the surface-moisturizing step. After around 6 minutes of air-drying following surface-moisturizing, they were cured with carbon dioxide gas at 0.1 MPa (15 psi) pressure for 24 hours. The abrasion resistance of carbonated precast concrete samples was evaluated identically as sample A and the results are recorded in Table 5. Compared with the abrasion testing result of conventional carbonated precast concrete (sample B in Table 1), the improvement in abrasion resistance is obvious with the added surface-moisturizing step. In addition, using steel slag slurry is more effective in improving the abrasion resistance of carbonated precast concrete than using cement or hydrated lime slurry.

TABLE 5

Abrasion resistance of surface-strengthened carbonated precast concrete

| Properties | Samples | | |
|---|---|---|---|
| | G | H | I |
| Mass Loss after Abrasion Test (g/min) | 0.45 | 0.40 | 0.33 |

Example 5

Precast concrete samples were prepared with the mix design shown below:

TABLE 6a

Mix design for samples J, K, L, and M

| Ingredients | Proportions |
|---|---|
| Steel slag | 172.3 g |
| Aggregates | 289.5 g |
| Water | 32.5 g |
| AEA | 0.21 g |

TABLE 6b

Compositions for samples J, K, L, and M

| Ex. mix ratio | total | binder | aggregate | water | additives |
|---|---|---|---|---|---|
| 5 | 494.51 | 0.348 | 0.585 | 0.066 | 0.0004 |
| w/b*: 0.19 | | 34.8% | 58.5% | 6.6% | 0.04% |

*water to binder ratio

The raw materials were mixed together, formed and then consolidated to the desired density. After being demolded, precast concrete samples were conditioned in front of a commercial fan with an air flow rate of 43 m³/min for 2 hours at room temperature. This conditioning process results in a 53% water reduction for both samples J and K, and 49% for both samples L and M. After that, surface-moisturizing was conducted by completely submerging precast concrete sample J in water for 5 seconds, achieving a weight gain of 245 g/m². Precast concrete samples K, L, and M were surface-moisturized by being completely submerged in 25% cement slurry, 25% steel slag slurry, and 25% hydrated lime slurry, respectively, for 5 seconds, achieving a weight gain of 283, 295 and 305 g/m², respectively. Surface-moisturized precast concrete samples were then air-dried at ambient temperature for around 10 minutes before they were loaded into a pressure chamber for carbonation curing. Adjusted to a pressure of 0.1 MPa (15 psi), carbon dioxide gas was introduced into the sealed pressure chamber. The duration of carbonation curing was set for 24 hours. After carbonation curing, the density, water absorption, compressive strength and freeze-thaw resistance of the carbonated precast concrete samples were evaluated following the methods described in Example 1. The obtained results are recorded in Table 6c. Compared with the specifications of ASTM C1372 shown in Table 2, samples J, K, L, and M can all be accepted for retaining wall application. With the help of the surface-moisturizing step, they possess a much greater freeze-thaw resistance than conventional carbonated precast concrete (sample B in Table 1). In addition, dipping in cement slurry or water offers carbonated precast concrete a greater freeze-thaw resistance than dipping in the slurry of steel slag or hydrated lime. Furthermore, dipping in water for 5 seconds offers carbonated precast concrete a greater freeze-thaw resistance than dipping in water for only 1 second, if the freeze-thaw testing result of sample J is compared with that of sample A in Table 1.

TABLE 6c

Key physical-mechanical properties and durability of surface-strengthened carbonated precast concrete

| Properties | Samples | | | |
| --- | --- | --- | --- | --- |
| | J | K | L | M |
| Density (kg/m$^3$) | 2413 | 2397 | 2356 | 2343 |
| Water Absorption (kg/m$^3$) | 107 | 107 | 108 | 106 |
| Compressive Strength (MPa) | 31 | 47 | 40 | 37 |
| Mass Loss after Freeze-thawing Test (%) | 0.1 | 0.1 | 0.3 | 0.7 |

Example 6

Precast concrete sample N was prepared with the mix design shown below. The main characteristic of this mix design is the increased dosage of water repellent admixture (WRA) from a conventional 0.2-0.4% to 2.0%, together with a binary binder system (combined use of steel slag and ordinary Portland cement).

TABLE 7a

Mix design for sample N

| Ingredients | Proportions |
| --- | --- |
| Steel slag | 222.5 g |
| Cement (ratio cement to total binder: 0.1) | 24.7 g |
| Aggregates | 223.6 g |
| Water | 28.3 g |
| WRA | 4.9 g |

TABLE 7b

Composition of sample N

| Ex. mix ratio | total | binder | aggregate | water | additives |
| --- | --- | --- | --- | --- | --- |
| 6 | 504 | 0.490 | 0.444 | 0.056 | 0.091 |
| w/b*: 0.11 | | 49.0% | 44.4% | 5.6% | 9.1% |

*water to binder ratio

The raw materials were mixed together, formed and then consolidated to the desired density. After being demolded, precast concrete sample N was conditioned in front of a commercial fan with an air flow rate of 43 m$^3$/min for 30 minutes at room temperature, resulting in a moisture loss of 21%. After that, this precast concrete sample was immediately loaded into a pressure chamber for carbonation curing, no surface-moisturizing was applied to it. Adjusted to a pressure of 0.1 MPa (15 psi), carbon dioxide gas was introduced into the sealed pressure chamber. The duration of carbonation curing was set for 24 hours. After carbonation curing, the density, water absorption, compressive strength, freeze-thaw resistance and abrasion resistance of the carbonated precast concrete sample were evaluated following the methods described in Example 1. The obtained results are recorded in Table 7c. Compared to the specifications of ASTM C1372 shown in Table 2, sample N can be accepted well for retaining wall application. It has a much better freeze-thaw resistance than conventional carbonated precast concrete (sample B in Table 1). It has better freeze-thaw resistance than carbonated precast concrete with the surface-moisturizing treatment (sample A in Table 1, samples C and D in Table 3, and samples J, K L, and M in Table 6c). Unfortunately, no improvement in abrasion resistance is obtained with a high dosage of water repellent admixture, if the abrasion testing result in Table 7c is compared with the abrasion resistance of sample B in Table 1.

TABLE 7c

Key physical-mechanical properties and durability of carbonated concrete with a high dosage of water repellent admixture

| Properties | Sample N |
| --- | --- |
| Density (kg/m$^3$) | 2314 |
| Water Absorption (kg/m$^3$) | 134 |
| Compressive Strength (MPa) | 32 |
| Mass Loss after Freeze-thawing Test (%) | 0.04 |
| Mass Loss after Abrasion Test (g/min) | 3.93 |

Example 7

A layered structure was used for sample O fabrication, with a binary binder composition containing 90% steel slag and 10% ordinary Portland cement. The carbonated precast concrete was designed for concrete paver or similar applications. The top layer of sample O was 6 mm thick. Its substrate layer was 24-45 mm thick, varying with the needed property tests. The mix designs for sample O are shown below:

TABLE 8a

Mix design for sample O

| Ingredients | Top Layer | Substrate Layer |
| --- | --- | --- |
| Steel Slag | 17.7 g | 133.9 g |
| Cement (ratio cement to total binder: 0.1) | 2.0 g | 14.9 g |
| Aggregates | 17.2 g | 132.2 g |
| Water | 3.2 g | 19.1 g |
| AEA | 0.02 g | — |
| WRA | — | 3.0 g |

TABLE 8b

Composition of sample O

| Ex. mix ratio | total | binder | aggregate | water | additives |
| --- | --- | --- | --- | --- | --- |
| 7 (top) | 40.12 | 0.491 | 0.429 | 0.08 | 0.0005 |
| w/b*: 0.16 | | 49.1% | 42.9% | 8% | 0.05% |
| 7 (substrate) | 300.1 | 0.496 | 0.44 | 0.06 | 0.01 |
| w/b*: 0.13 | | 49.6% | 44% | 6% | 1% |

*water to binder ratio

The concrete mixtures for top and substrate layers were prepared separately. After all of the raw materials were mixed together, the substrate layer mixture was formed into a mold and levelled off before the top layer mixture was added. The formed material was then consolidated by compaction and vibration to the desired density. After being demolded, precast concrete sample O was conditioned in front of a commercial fan with an air flow rate of 43 m$^3$/min for 2 hours at room temperature, achieving a water reduction of 36%. After that, surface moisturizing was conducted by submerging the top layer part of precast concrete sample O in water for 3 seconds, achieving a weight gain of 84 g/m². Surface-moisturized precast concrete was then air-dried at ambient temperature for around 10 minutes before it was loaded into a pressure chamber for carbonation curing. Adjusted to a pressure of 0.1 MPa (15 psi), carbon dioxide gas was introduced into the sealed pressure chamber. The duration of carbonation curing was set for 24 hours. After carbonation curing, the following properties of carbonated precast concrete were evaluated:

Density, moisture content, water absorption and compressive strength—in accordance with ASTM C140;

Freeze-thaw resistance—in accordance with ASTM C1645, using 3% NaCl solution;

Abrasion resistance—in accordance with ASTM C944.

For comparison purpose, a single-layer carbonated precast concrete sample P was made with a mix design very close to that of the substrate layer of sample O, the only difference being that the mix of sample P has an initial water to binder ratio of 0.11, whereas that of the substrate layer of sample O has a water to binder ratio of 0.13. Sample P was made following the identical formulation and manufacturing process of sample N. Prior to carbonation curing, it was conditioned in front of a commercial fan with an air flow rate of 43 m³/min for 2 hours at room temperature, resulting in a 26% water reduction. The properties of sample P were evaluated with the same testing methods used for sample O. The testing results of both samples O and P are summarized in Table 8c. The obtained testing results are then compared with the specifications of ASTM C936 for concrete pavers shown in Table 9.

ASTM C936 specifies a sandblasting method (ASTM C418) to measure the abrasion resistance of concrete pavers. Facing the complexity and the availability problem of ASTM C418, an alternative method—ASTM C944—is chosen to evaluate the abrasion resistance of samples O and P.

In order to judge the abrasion resistance quality of samples O and P, commercial concrete pavers were sourced from Home Depot, including 4 concrete interlocking paving units and 5 different types of paving slabs. The abrasion resistance of the purchased concrete pavers was tested following ASTM C944. The lowest abrasion-resulted mass loss among the tested commercial concrete pavers was chosen as the benchmark for assessing the abrasion resisting capacity of samples O and P, which is displayed in Table 9.

Lack of a layered-structure, sample P has a very poor abrasion resistance. It has a mass loss 25 times higher than sample O after the abrasion test. Sample P also has a slightly lower strength but better water absorption and freeze-thaw resistance than sample O. Compared with the specifications of ASTM C936 and the best abrasion resistance of commercial concrete pavers shown in Table 9, sample P cannot be accepted for concrete paver application, mainly for its poor abrasion resistance. On the contrary, sample O has an abrasion resistance almost equivalent to the best class of commercial concrete pavers (Table 9), due to the layered structure combined with the surface-strengthening effect of surface-moisturizing. Its water absorption, strength and freeze-thaw resistance conform to the requirements of ASTM C936. It is apparent that sample O is well suited for concrete paver application.

26

TABLE 8c

Key physical-mechanical properties and durability of layer-structured carbonated precast concrete and single-layer counterpart

| Properties | Samples | |
| --- | --- | --- |
| | O | P (control) |
| Density (kg/m³) | 2412 | 2386 |
| Water Absorption (%) | 3.8 | 2.9 |
| Compressive Strength (MPa) | 55 | 49 |
| Mass Loss after Freeze-thawing Test (g/m²) | 107 | 15 |
| Mass Loss after Abrasion Test (g/min) | 0.16 | 3.93 |

TABLE 9

Specifications of ASTM C936 for concrete interlocking paving units and the best abrasion resistance of commercial concrete pavers

| Properties | ASTM C936 Specification | Commercial Concrete Paver |
| --- | --- | --- |
| Density (kg/m³) | — | — |
| Water Absorption (%) | ≤5.0 | — |
| Compressive Strength (MPa) | ≥55 | — |
| Mass Loss after Freeze-thawing Test (g/m²) | ≤225 | — |
| Lowest Mass Loss after Abrasion Test (g/min) | — | 0.15 |

It can be found from Table 8c that sample O has a greater mass loss than sample P after 28 cycles of freeze-thaw testing. Such a result might result from the use of a high dosage of water repellent admixture in sample P. Although the top surface of sample O is strengthened by the added surface-moisturizing step, this surface-strengthening effect may not be as effective as a high dosage of water repellent admixture in freeze-thaw resistance. Nevertheless, the freeze-thawing resulted mass loss of sample O is still within the maximum allowance of ASTM standard for concrete pavers.

Example 8

A layered structure was used for sample Q fabrication, with steel slag as the sole binder. The carbonated precast concrete was designed for concrete paver or similar applications. The top layer of sample Q is 6 mm thick. Its substrate layer is 24-45 mm thick, varying with the needed property tests. Precast concrete sample was prepared with the mix design shown below:

TABLE 10a

Mix design for sample Q

| Ingredients | Top Layer | Substrate Layer |
| --- | --- | --- |
| Steel Slag | 20.0 g | 152.4 g |
| Aggregates | 16.8 g | 130.9 g |
| Water | 3.3 g | 20.1 g |
| AEA | 0.02 g | 0.18 g |
| WRA | — | 1.8 g |

TABLE 10b

| | Composition of sample Q | | | |
|---|---|---|---|---|
| Ex. mix ratio | total | binder | aggregate | water | additives |
| 8 (top) | 98.86 | 0.499 | 0.419 | 0.082 | 0.0006 |
| w/b*: 0.14 | | 49.9% | 41.9% | 8.2% | 0.06% |
| 8 (substrate) | 400.84 | 0.499 | 0.429 | 0.066 | 0.0066 |
| w/b*: 0.13 | | 49.9% | 42.9% | 6.6% | 0.7% |

*water to binder ratio

The concrete mixtures for top and substrate layers were prepared separately. After all of the raw materials were mixed together, the substrate layer mixture was formed into a mold and levelled off before the top layer mixture was added. The formed material was then consolidated under compaction and vibration to the desired density. After being demolded, precast concrete sample Q was conditioned in front of a commercial fan with an air flow rate of 43 m³/min for 2 hours at room temperature, losing 41% of its initial moisture content. After that, surface-moisturizing was conducted by submerging the top layer part of precast concrete in water for 3 seconds, achieving a weight gain of 103 g/m² due to water absorption. Surface-moisturized precast concrete was then air-dried at ambient temperature for around 10 minutes before it was loaded into a pressure chamber for carbonation curing. Adjusted to a pressure of 0.1 MPa (15 psi), carbon dioxide gas was introduced into the sealed pressure chamber. The duration of carbonation curing was 24 hours. After carbonation curing, the physical-mechanical properties and durability of carbonated precast concrete were evaluated as described in Example 7.

For comparison purpose, a single-layer carbonated precast concrete sample R was made with the identical formulation as the substrate layer of sample Q, but without the surface-moisturizing step. After being conditioned in front of a commercial fan with an air flow rate of 43 m³/min for 2 hours at room temperature, sample R loses 47% of its initial moisture content. Its properties were also evaluated. The testing results of both samples Q and R are summarized in Table 10c.

Lack of a layered structure and a surface-moisturizing step, sample R has a very poor abrasion resistance. It has a mass loss 9 times higher than sample Q after the abrasion test. Sample R also has a greater water absorption than sample Q, although its strength is similar to sample Q and its freeze-thaw resistance is slightly better. Compared with the specifications of ASTM C936 and the best abrasion resistance of commercial concrete pavers shown in Table 9, sample R cannot be accepted for concrete paver application, mainly for its poor abrasion resistance. On the contrary, sample Q has an abrasion resistance better than the best class of commercial concrete pavers (Table 9), due to the layered structure combined with the surface-strengthening effect of surface-moisturizing. Its water absorption, strength and freeze-thaw resistance conform to the requirements of ASTM C936. It is apparent that sample Q is well suited for concrete paver application.

TABLE 10c

Key physical-mechanical properties and durability of layer-structured carbonated precast concrete and single-layer counterpart

| | Samples | |
|---|---|---|
| Properties | Q | R (control) |
| Density (kg/m³) | 2433 | 2352 |
| Water Absorption (%) | 3.4 | 3.7 |
| Compressive Strength (MPa) | 56 | 57 |

TABLE 10c-continued

Key physical-mechanical properties and durability of layer-structured carbonated precast concrete and single-layer counterpart

| | Samples | |
|---|---|---|
| Properties | Q | R (control) |
| Mass Loss after Freeze-thawing Test (g/m²) | 152 | 144 |
| Mass Loss after Abrasion Test (g/min) | 0.12 | 1.03 |

REFERENCES

The references below are all incorporated herein by reference in their entirety.

ACI Committee. (2008). 201.2R-08: Guide to Durable Concrete *Durability*. Michigan, US: American Concrete Institute.

ASTM. (2017). Standard Specification for Dry-Cast Segmental Retaining Wall Units (Vol. ASTM C1372-17). West Conshohocken, PA: ASTM International.

ASTM. (2018a). Standard Specification for Solid Concrete Interlocking Paving Units (Vol. ASTM C936/C936M-18). West Conshohocken, PA: ASTM International.

ASTM. (2018b). Standard Test Method for Evaluating the Freeze-Thaw Durability of Dry-Cast Segmental Retaining Wall Units and Related Concrete Units (Vol. ASTM C1262/C1262M-18). West Conshohocken, PA: ASTM International.

ASTM. (2018c). Standard Test Methods for Sampling and Testing Concrete Masonry Units and Related Units (Vol. ASTM C140/C140M-18). West Conshohocken, PA: ASTM International.ASTM. (2019a). Standard Test Method for Abrasion Resistance of Concrete or Mortar Surfaces by the Rotating-Cutter Method (Vol. ASTM C944/C944M-19). West Conshohocken, PA: ASTM International.

ASTM. (2019b). Standard Test Method for Freeze-thaw and De-icing Salt Durability of Solid Concrete Interlocking Paving Units (Vol. ASTM C1645-19). West Conshohocken, PA: ASTM International.

CSA. (2005). CSA A231.2 Precast concrete paving slabs/ Precast concrete pavers. Toronto, Ontario: CSA.

Environmental Protection Agency. (1995). *AP 42—Compilation of Air Pollutant Emission Factors, 5th Edition, Volume* 1. Research Triangle Park, NC: U. S. Environmental Protection Agency.

Patel, H., Bland, C., & Poole, A. (1995). The microstructure of concrete cured at elevated temperatures. *Cement and Concrete Research,* 25(3), 485-490.

Zhang, D., Ghouleh, Z., & Shao, Y. (2017). Review on carbonation curing of cement-based materials. *Journal of CO2 Utilization,* 21, 119-131. doi:10.1016/j.jcou.2017.07.003

What is claimed is:

1. A method of making a carbonated precast concrete product, comprising:

obtaining an intermediate having a core and an external layer disposed on a surface of the core, the core having a first composition and the external layer having a second composition different than the first composition, the intermediate being demolded, wherein faces of the intermediate are exposed to ambient air, and wherein a binder of the second composition of the external layer is selected from the group consisting of ground granulated blast-furnace slag (GGBFS), steel slag, and stainless steel slags;

conditioning the intermediate to obtain a conditioned intermediate thereby reducing a water-to-binder ratio of at least the external layer, including reducing the water-to-binder ratio by evaporating a portion of water contained in the external layer;

after the conditioning of the intermediate, at least partially compensating for an excessive reduction of the water-to-binder ratio of the external layer by causing a weight gain in the external layer by applying an aqueous medium on an outer surface of the external layer of the conditioned intermediate to increase the water-to-binder ratio of the external layer to obtain a moisturized intermediate, the excessive reduction of the water-to-binder ratio resulting in a moisture content at the outer surface being about 50% of a moisture content at the core of the conditioned intermediate, the external layer extending from the outer surface of the conditioned intermediate towards the surface of the core; and curing the moisturized intermediate with carbon dioxide to obtain the carbonated precast concrete product.

2. The method of claim 1, wherein the at least partially compensating for the reduction of the water-to-binder ratio by causing the weight gain includes causing the weight gain of the external layer of at least 10 g/m$^2$.

3. The method of claim 2, wherein the causing of the weight gain of the external layer of at least 10 g/m$^2$ includes causing the weight gain of 50 g/m$^2$ to 350 g/m$^2$.

4. The method of claim 1, wherein the at least partially compensating for the reduction of the water-to-binder ratio by causing the weight gain in the external layer with the aqueous medium includes applying one or more of water, a water-based solution, and a water-based slurry to the external layer.

5. The method of claim 1, wherein the obtaining of the intermediate having the core and the external layer includes obtaining the intermediate with the external layer having a water-to-binder ratio greater than a water-to-binder ratio of the core.

6. The method of claim 1, wherein the obtaining of the intermediate having the core and the external layer includes obtaining the intermediate with the external layer having a binder content greater than a binder content of the core.

7. The method of claim 1, wherein the obtaining of the intermediate having the core and the external layer includes obtaining the intermediate in which second composition of the external layer is devoid of a water repellent admixture.

8. The method of claim 1, wherein the obtaining of the intermediate having the core and the external layer includes obtaining the intermediate in which the second composition of the external layer is devoid of a cementitious binder.

9. A method of making a carbonated precast concrete product, comprising:

applying an external layer on a core to obtain an intermediate, the core and the external layer differing in their respective compositions, the intermediate being demolded, faces of the intermediate being exposed to ambient air, wherein a binder of the external layer is selected from the group consisting of ground granulated blast-furnace slag, steel slag, and stainless steel slags;

conditioning the intermediate to obtain a conditioned intermediate thereby reducing a water-to-binder ratio of at least the external layer, including reducing the water-to-binder ratio by evaporating a portion of water contained in the external layer;

after the conditioning of the intermediate, at least partially compensating for an excessive reduction of the water-to-binder ratio of the external layer by causing a weight gain in the external layer by applying an aqueous medium on an outer surface of the external layer of the conditioned intermediate to increase the water-to-binder ratio of the external layer to obtain a moisturized intermediate, the excessive reduction of the water-to-binder ratio resulting in a moisture content at the outer surface being about 50% of a moisture content at the core of the conditioned intermediate, the external layer extending from the outer surface of the conditioned intermediate towards the core; and curing the moisturized intermediate with carbon dioxide to obtain the carbonated precast concrete product.

10. The method of claim 9, wherein the at least partially compensating for the reduction of the water-to-binder ratio by causing the weight gain includes causing the weight gain of the external layer of at least 10 g/m$^2$.

11. The method of claim 10, wherein the causing of the weight gain of the external layer of at least 10 g/m$^2$ includes causing the weight gain of 50 g/m$^2$ to 350 g/m$^2$.

12. The method of claim 9, wherein the at least partially compensating for the reduction of the water-to-binder ratio by causing the weight gain in the external layer with the aqueous medium includes applying one or more of water, a water-based solution, and a water-based slurry to the external layer.

13. The method of claim 9, wherein a water-to-binder ratio of the external layer is greater than a water-to-binder ratio of the core.

14. The method of claim 9, wherein a binder content of the external layer is greater than a binder content of the core.

15. The method of claim 9, wherein the external layer is devoid of a water repellent admixture.

16. The method of claim 9, wherein the binder of the external layer is devoid of a cementitious binder.

* * * * *